(12) United States Patent
Han

(10) Patent No.: US 11,094,000 B2
(45) Date of Patent: Aug. 17, 2021

(54) METHOD AND SYSTEM FOR IMAGE TRANSACTION, ELECTRONIC DEVICE AND STORAGE MEDIUM

(71) Applicant: BOE Technology Group Co., Ltd., Beijing (CN)

(72) Inventor: Litong Han, Beijing (CN)

(73) Assignee: BOE Technology Group Co., Ltd, Beijing (CN)

(*) Notice: Subject to any disclaimer, the term of this patent is extended or adjusted under 35 U.S.C. 154(b) by 214 days.

(21) Appl. No.: 16/372,592

(22) Filed: Apr. 2, 2019

(65) Prior Publication Data

US 2019/0370886 A1 Dec. 5, 2019

(30) Foreign Application Priority Data

May 30, 2018 (CN) .......................... 201810538493.2

(51) Int. Cl.
*G06Q 30/06* (2012.01)
*G06F 16/51* (2019.01)
(Continued)

(52) U.S. Cl.
CPC ..... *G06Q 30/0641* (2013.01); *G06F 3/04817* (2013.01); *G06F 16/51* (2019.01);
(Continued)

(58) Field of Classification Search
CPC ............ G06Q 30/0635; G06Q 30/0641; G06F 16/51; G06F 3/04817; G06F 3/0482; H04L 67/10; H04L 67/1097
(Continued)

(56) References Cited

U.S. PATENT DOCUMENTS

| 9,129,307 B2* | 9/2015 | Fowler .................. G06Q 30/04 |
| 2005/0138009 A1 | 6/2005 | Deshpande et al. |

(Continued)

FOREIGN PATENT DOCUMENTS

| CN | 102684986 A | 9/2012 |
| CN | 103248684 A | 8/2013 |

(Continued)

OTHER PUBLICATIONS

First office action of Chinese application No. 201810538493.2 dated Jul. 30, 2020.

(Continued)

*Primary Examiner* — Yogesh C Garg
(74) *Attorney, Agent, or Firm* — Fay Sharpe LLP

(57) ABSTRACT

Embodiments of the present disclosure provide a method and system for image transaction, an electronic device and a storage medium. The method for image transaction is applied to a transaction server in a system for image transaction. The system comprises an image purchasing terminal and the transaction server. The image purchasing terminal is a terminal logged in with a purchase account. The method comprises: sending transaction interface information to the image purchasing terminal, wherein the transaction interface information comprises data of at least one thumbnail to be displayed by the image purchasing terminal, and each thumbnail corresponds to one original image; receiving a purchase request that is sent by the image purchasing terminal for requesting purchase of a target original image; and completing a transaction of the target original image based on the purchase request.

20 Claims, 11 Drawing Sheets

(51) Int. Cl.
*G06F 3/0481* (2013.01)
*G06Q 20/12* (2012.01)
*H04L 29/08* (2006.01)

(52) U.S. Cl.
CPC ......... *G06Q 20/12* (2013.01); *G06Q 30/0635* (2013.01); *H04L 67/10* (2013.01); *H04L 67/1097* (2013.01)

(58) Field of Classification Search
USPC .................................. 705/26.81, 27.1, 26.1
See application file for complete search history.

(56) References Cited

U.S. PATENT DOCUMENTS

| | | | |
|---|---|---|---|
| 2011/0047146 A1* | 2/2011 | Scott | G06F 16/20 707/722 |
| 2014/0032320 A1* | 1/2014 | Sivaraman | G06Q 30/06 705/14.54 |
| 2016/0350826 A1* | 12/2016 | Glasgow | G06T 7/0002 |
| 2018/0174549 A1* | 6/2018 | Whang | G09G 5/003 |
| 2019/0065763 A1* | 2/2019 | Berg | G16H 30/20 |

FOREIGN PATENT DOCUMENTS

| | | | | |
|---|---|---|---|---|
| CN | 104243923 A | | 12/2014 | |
| CN | 104765863 A | | 7/2015 | |
| CN | 105095233 A | | 11/2015 | |
| CN | 106406855 A | | 2/2017 | |
| CN | 107145494 A | * | 9/2017 | ............. G06F 17/30 |

OTHER PUBLICATIONS

Second office action of Chinese application No. 201810538493.2 dated Apr. 2, 2021.

* cited by examiner

METHOD AND SYSTEM FOR IMAGE TRANSACTION, ELECTRONIC DEVICE AND STORAGE MEDIUM

CROSS-REFERENCE TO RELATED APPLICATION

This disclosure claims priority to Chinese Patent Application No. 201810538493.2, filed with the National Intellectual Property Administration of P.R.C. on May 30, 2018 and entitled "IMAGE ACCESS METHOD AND DEVICE, ELECTRONIC DEVICE AND STORAGE MEDIUM", the entire contents of which are incorporated herein by reference.

TECHNICAL FIELD

The present disclosure relates to the field of image processing technology and in particular to a method and system for image transaction, an electronic device and a storage medium.

BACKGROUND

With increasing improvement of economic level, demands for appreciation of art in painting, photography, etc. have increased gradually. Thus, demands for buying image works such as digital image works and photos are growing fast.

SUMMARY

According to an aspect of embodiments of the present disclosure, there is provided a method for image transaction applied to a transaction server in a system for image transaction. The image purchasing terminal is a terminal logged in with a purchase account. The method comprises:

sending transaction interface information to the image purchasing terminal, wherein the transaction interface information comprises data of at least one thumbnail to be displayed by the image purchasing terminal, and each thumbnail corresponds to one original image;

receiving a purchase request that is sent by the image purchasing terminal for requesting purchase of a target original image, wherein the target original image corresponds to a target thumbnail, and the target thumbnail is one of the at least one thumbnail; and completing a transaction of the target original image based on the purchase request.

Optionally, said completing a transaction of the target original image based on the purchase request comprises:

acquiring transaction data based on the purchase request, wherein the transaction data are any of an authorized access path of the target original image and data of the target original image, and the authorized access path of the target original image is a path authorized to acquire the target original image; and sending the transaction data to an image receiving terminal associated with the purchase account after determining that the image purchasing terminal completes a payment operation of the target original image.

Optionally, the transaction data are the data of the target original image, the transaction interface information comprises an identifier of the at least one thumbnail, the purchase request comprises an identifier of the target thumbnail, and said acquiring transaction data based on the purchase request comprises:

inquiring, based on the identifier of the target thumbnail in the purchase request, a first corresponding relationship between the identifier of the thumbnail and an identifier of the original image, to obtain an identifier of the target original image corresponding to the identifier of the target thumbnail; and acquiring the data of the target original image corresponding to the identifier of the target original image.

Optionally, the system for image transaction further comprises an image providing device, and the method for image transaction further comprises:

receiving data of the original image sent by the image providing device;

storing the received data of the original image in a database of the transaction server;

acquiring a thumbnail of the received original image; and recording an identifier of the received original image and an identifier of the acquired thumbnail in the first corresponding relationship.

Optionally, said storing the received data of the original image in a database of the transaction server comprises:

redirecting the received data of the original image to historical data when the database has stored the historical data that is identical to the received data of the original image; and storing a second corresponding relationship between the historical data and the identifier of the received original image in the database of the transaction server, wherein the second corresponding relationship is used to acquire the historical data based on the identifier of the received original image for the transaction server.

Optionally, the transaction data are the data of the target original image, the transaction interface information comprises an identifier of the at least one thumbnail, the purchase request comprises an identifier of the target thumbnail, the system for image transaction further comprises an image providing device, and said acquiring transaction data based on the purchase request comprises:

inquiring, based on the identifier of the target thumbnail in the purchase request, a third corresponding relationship between the identifier of the thumbnail and the authorized access path, to obtain the authorized access path of the target original image, wherein the authorized access path comprises an access permission and a data acquisition address;

sending a data acquisition request to the image providing device indicated by the data acquisition address, wherein the data acquisition request comprises the access permission; and receiving the data of the target original image, sent by the image providing device, based on the access permission.

Optionally, the method further comprises:

receiving the thumbnail of the original image sent by the image providing device, and the authorized access path of the original image; and recording the identifier of the received thumbnail and the authorized access path of the original image in the third corresponding relationship.

Optionally, the transaction data are the authorized access path of the target original image, the transaction interface information comprises an identifier of the at least one thumbnail, the purchase request comprises an identifier of the target thumbnail, and said acquiring transaction data based on the purchase request comprises:

inquiring, based on the identifier of the target thumbnail in the purchase request, a third corresponding relationship between the identifier of the thumbnail and the authorized access path, to obtain the authorized access path of the target original image.

Optionally, the system for image transaction further comprises an image providing device, and the method for image transaction further comprises:

receiving the thumbnail of the original image sent by the image providing device, and the authorized access path of the original image; and recording the identifier of the received thumbnail and the received authorized access path of the original image in the third corresponding relationship.

Optionally, said sending the transaction data to an image receiving terminal associated with the purchase account comprises:

encrypting the transaction data, wherein a secret key adopted for encryption is at least one of a transaction number and an identifier of the image purchasing terminal, and the transaction number is generated after the image purchasing terminal completes the payment operation of the target original image; and providing the image receiving terminal with the encrypted transaction data.

Optionally, said encrypting the transaction data comprises:

encrypting the transaction data by the secret key in accordance with an encryption algorithm, wherein the encryption algorithm is one of a two-dimensional discrete Fourier transformation algorithm and a two-dimensional discrete cosine transform algorithm.

Optionally, the image receiving terminal is one of the following terminals:

the terminal logged in with the purchase account;

a display terminal bound to the purchase account; and a terminal logged in with an account associated with the purchase account.

Optionally, the method further comprises:

acquiring a thumbnail that matches a resolution of a display screen of the image purchasing terminal when the image purchasing terminal accesses the transaction server; and generating the transaction interface information, wherein the transaction interface information comprises data of the thumbnail that matches the resolution of the display screen.

Based on the same inventive concept, according to yet another aspect of embodiments of the present disclosure, there is provided an electronic device. The electronic device comprises: a memory and a processor; wherein at least one program is stored in the memory and used to be executed by the processor to realize the steps of any of the method for image transactions described above.

Optionally, the electronic device is disposed on the server side, and the server side may include a single server, a server group, a distributed server, a cloud server, etc.

Based on the same inventive concept, according to yet another aspect of embodiments of the present disclosure, there is provided a method for image transaction. The method for image transaction comprises:

a transaction server sending transaction interface information to an image purchasing terminal, wherein the transaction interface information comprises data of at least one thumbnail to be displayed by the image purchasing terminal, and each thumbnail corresponds to one original image;

the image purchasing terminal receiving the transaction interface information, and displaying the at least one thumbnail based on the transaction interface information;

the image purchasing terminal sending a purchase request for requesting purchase of a target original image to the transaction server, wherein the target original image corresponds to a target thumbnail, and the target thumbnail is one of the at least one thumbnail; and the transaction server receiving the purchase request and completing a transaction of the target original image based on the purchase request.

Based on the same inventive concept, according to still yet another aspect of embodiments of the present disclosure, there is provided a system for image transaction. The system for image transaction comprises: an image purchasing terminal and a transaction server; wherein the transaction server is used to send transaction interface information to the image purchasing terminal, wherein the transaction interface information comprises data of at least one thumbnail to be displayed by the image purchasing terminal, and each thumbnail corresponds to one original image;

the image purchasing terminal is used to receive the transaction interface information and to display the at least one thumbnail based on the transaction interface information;

the image purchasing terminal is also used to send a purchase request for requesting purchase of a target original image to the transaction server, wherein the target original image corresponds to a target thumbnail, and the target thumbnail is one of the at least one thumbnail; and the transaction server is also used to receive the purchase request and to complete a transaction of the target original image based on the purchase request.

Optionally, the transaction server is used to:

acquire transaction data based on the purchase request, wherein the transaction data are any of an authorized access path of the target original image and data of the target original image, and the authorized access path of the target original image is a path authorized to acquire the target original image; and send the transaction data to an image receiving terminal associated with a purchase account after determining that the image purchasing terminal completes a payment operation of the target original image, wherein the image purchasing terminal is a terminal logged in with the purchase account.

Optionally, the system for image transaction further comprises an image providing device used to provide the transaction server with data of the original image.

Based on the same inventive concept, according to still yet another aspect of embodiments of the present disclosure, there is provided a computer storage medium on which a computer program corresponding to any of the above method for image transactions is stored.

Additional aspects and advantages of the present disclosure will be provided in part in the following description, and they will become apparent from the following description or well-known through practice of the present disclosure.

BRIEF DESCRIPTION OF THE DRAWINGS

The above and/or additional aspects and advantages of the present disclosure will become apparent and readily understood from the following description of embodiments with reference to the drawings.

DETAILED DESCRIPTION

Figure 1:
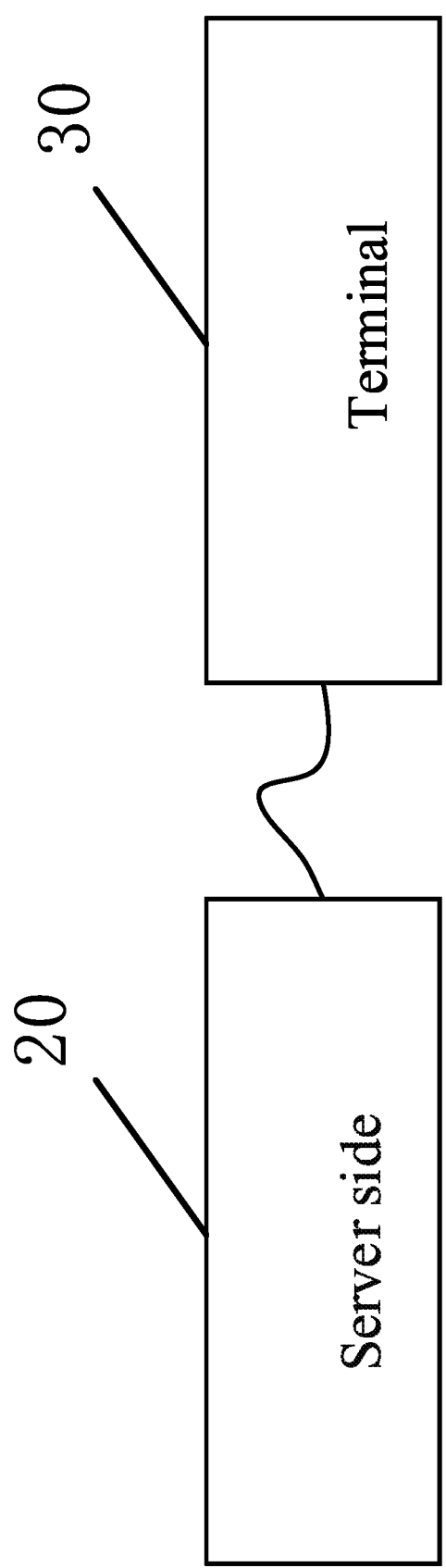
FIG. 1 is a schematic frame diagram of an application scenario of a method for image transaction according to an embodiment of the present disclosure.

With increasing improvement of living standards, on one hand, more and more people have the need to improve their literary attainment. Many people have a great enthusiasm for learning and a high demand for appreciating excellent works in painting, photography, etc., hoping to have the opportunity to view a large number of professional picture works and to choose several favorites to buy.

On the other hand, there are numerous picture agencies and lots of professional photographers, painters, and institutions similar to museums, galleries, etc. in the society. They have the desire to sell their works or collections to numerous media companies and advertising companies or other fields in demand to earn income.

However, the inventor of the present disclosure discovered that people having the desire to appreciate or buy some works usually can only go to museums, galleries or arts centers where the works are collected, which takes much time and effort. Even today, when the network is developed, there has been no trading platform that can provide professional services based on art works can be found, resulting in no convenient and efficient communication between potential customers (or potential consumers) and holders of the works all the time.

How to build a convenient and efficient communication platform between the consumers and authors such that people can quickly browse a large number of picture works, choose required pictures therefrom and then place orders for purchase has always been a technical problem that has never been solved well between the consumers and the holders of works, which limits the sales of digital image works.

The present disclosure provides a method for image transaction, device and system to at least partially solve the problem and defect that there lacks a professional communication trading platform between the potential consumers and the holders of the digital image works, thus solving the technical problem that the sales of the digital image works is greatly limited caused by the lacks of professional communication trading platform between the potential consumers and the holders of the digital image works.

A description of the embodiments of the present disclosure will be made in detail. The examples of the embodiments are illustrated in the accompanying drawings. The reference numbers which are the same or similar throughout the accompanying drawings represent the same or similar elements or elements with the same or similar functions. The embodiments described below with reference to the accompanying drawings are intended to be illustrative only, and are not to be construed as limitations to the present disclosure.

It can be understood by those skilled in the art that the singular forms "a", "an", "the" and "said" may also encompass plural forms, unless otherwise stated. It should be further understood that the expression "comprise" or "include" used in the description of the present disclosure means there exists a feature, an integer, a step, an operation, an element and/or a component, but could not preclude the existing or adding of one or more other features, integers, steps, operations, elements, components and/or groups thereof. It should be understood that when we refer to an element as being "connected" or "coupled" to another element, it can be directly connected or coupled to the another element, or an intermediate element can be present. Besides, "connected" or "coupled" as used herein may include either a wireless connection or a wireless coupling. The expression "and/or" as used herein includes all or any one and all combinations of one or more of relevant listed items.

Those skilled in the art will appreciate that all terms (including technical and scientific terms) as used herein have the same meanings as commonly understood by those of ordinary skill in the art of the present disclosure, unless otherwise defined. It also should be understood that terms such as those defined in the general dictionary should be understood to have the meanings consistent with the meanings in the context of the prior art, and will not be interpreted in an idealized or overly formal meaning unless specifically defined as herein.

In the present disclosure, an image may be a digital image formed by scanning a real painting, a digital image formed by scanning a printed painting, a digital image formed by photographing with a digital camera, a digital image formed by digital processing of a photo from a traditional camera, or a digital image formed by image software of a computer, a drawing board or the like. The digital image may be in such formats as JPEG, PNG, BMP, TIFF and WebP.

FIG. 1 is a schematic frame diagram of an application scenario of a method for image transaction according to an embodiment of the present disclosure. It can be known from FIG. 1 that a server side 20 and a terminal 30 are related to the application scenario, and a communicating connection is established between the server side 20 and the terminal 30. In the application scenario, the server side may be a transaction server, which may be a server, a server cluster composed of a plurality of servers, or a cloud computing service center with storage resources. The terminal 30 may be an image purchasing terminal, which is a terminal logged in with a purchase account. The purchase account may be an account registered on the transaction server or an account associated with the registered account. The terminal 30 may be a mobile terminal, e.g., a smart phone, a tablet computer, a PC (Personal Computer), a PDA (Personal Digital Assistant), an e-reader or a wearable device, and may also be a fixed terminal, e.g., a television or a digital picture frame. The image purchasing terminal may access the transaction server to perform an image transaction.

Figure 2:
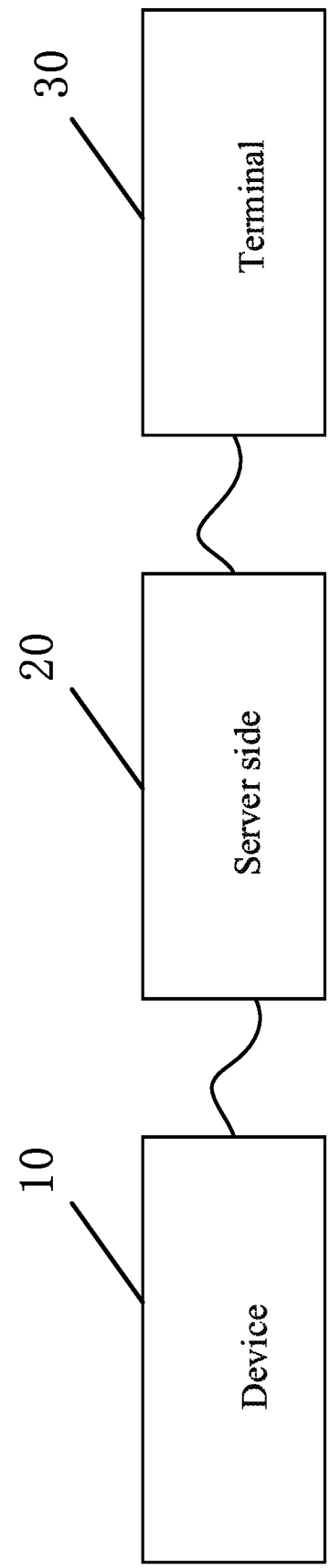
FIG. 2 is a schematic frame diagram of another application scenario of the method for image transaction according to an embodiment of the present disclosure.

FIG. 2 is a schematic frame diagram of another application scenario of a method for image transaction according to an embodiment of the present disclosure. It can be known from FIG. 2 that a system for image transaction includes a device 10 which may be an image providing device. The image providing device may be such a terminal as a PC, such a mobile terminal as a smart phone, a tablet computer or a laptop, a server or a data storage device, and also may be such a device that can directly form a digital image as a scanner or a drawing board.

It is worth noting that both the terminal 30 and the device 10 may be registered on the transaction server to facilitate communication of the transaction server.

In FIG. 1 and FIG. 2, the main process of an information exchange between the server side 20 and the device 10, as well as that between the server side 20 and the terminal 30, is as below:

The server side 20 outputs data of a thumbnail of an original image. The data of the thumbnail include a thumbnail and may further include relevant information that can identify the content of the thumbnail. Since the thumbnail is generated based on the original image and has the same content as the original image, the relevant information is also used for identifying the content of the original image. The terminal 30 displays the data of the thumbnail after receiving the data of the thumbnail of the original image. When receiving an acquisition instruction for acquiring a target original image associated with a target thumbnail or target relevant information from a user, the server side 20 generates and sends out a purchase request for requesting purchase of the target original image (the purchase request may be regarded as an access request for the target thumbnail or the target relevant information). The acquisition instruction may include a purchase instruction.

When receiving the purchase request sent by the terminal 30, the server side 20 completes a transaction of the target original image based on the purchase request. Exemplarily, this process may include determining whether the target original image is stored locally. In response to that the target original image is stored locally, the server side 20 feeds the target original image back to the terminal 30. Alternatively, in response to that the target original image is not stored locally, the server side 20 feeds an authorized access address of the target original image back to the terminal 30.

The so-called "original image" here means digital image works required to be transacted, e.g., a high-resolution or high-color-depth version (a high-definition version of an oil painting or a Chinese landscape painting) of a photo or a painting. The digital image works may have a resolution of more than or equal to 1,920*1,080 and a size of more than or equal to 32 inches. The "thumbnail" is an image obtained by compressing the original image. Usually, the thumbnail has a resolution smaller than that of the original image, e.g., 240*320, 320*480 or 1,280*720, etc., and also has a smaller size than the original image.

In some possible cases, holders of the image works, to which the image providing device belongs, may be photographers, painters or small photo agencies. These holders often own a small number of image works and probably have no special device for storing the image works. For the sake of cost and convenience of transaction, they prefer to upload their own image works (namely, the original image) to the transaction server. In this case, the image providing device can upload the original image to the transaction server.

In other possible cases, holders of the image works, to which the image providing device belongs, may be museums, galleries or arts centers. These holders often own a large number of image works and usually have special devices (e.g., servers) for storing the image works. For the sake of copyright protection, they prefer to avoid to upload their own image works (namely, the original image) to the transaction server. In this case, the image providing device can compress the self-stored original image to obtain the thumbnail corresponding to the original image, and then upload the thumbnail to the transaction server.

It should be noted that the image purchasing terminal needs to display the thumbnail and/or the relevant information in follow-up steps, and different types of terminals often have different resolutions. Thus, to guarantee the display effect of the thumbnail in the different types of terminals, the image providing device can compress the same original image in accordance with the resolutions of the different types of terminals to obtain a plurality of thumbnails corresponding to the resolutions of the different types of terminals. After that, the image providing device can upload the obtained plurality of thumbnails to the transaction server.

The thumbnail may be pre-stored or dynamically generated. In some embodiments, the server side 20 can detect the resolution of the terminal 30 and dynamically generate the thumbnail during an access of the terminal 30. For example, the server side 20 can acquire a screen resolution of the terminal 30, a window size of a current browser and the like through a JavaScript interaction. Thus, the thumbnail corresponding to the terminal 30 is generated.

In some embodiments, the server side 20 includes an image service module 201 used to receive, store, process and send the original image provided by an image providing module 101, and to generate the thumbnail corresponding to the original image based on the original image.

In this application scenario, the image service module can generate the thumbnail corresponding to the original image while the device 10, e.g., a PC side, uploads the original image. Thus, the flow and the performance overhead of the terminal 30, e.g., a mobile terminal, during browse of the original image are remarkably reduced. And, the design of a software architecture is simplified when the terminal 30 accesses the digital image works.

It should be noted that FIG. 1 or FIG. 2 merely represents one application scenario of the embodiment of the present disclosure. The embodiment of the present disclosure may also be applied to other application scenarios. For example, the device 10 corresponding to the PC side and the terminal 30 corresponding to the mobile terminal can independently take on the tasks of uploading and displaying the thumbnails respectively. That is, the PC side can serve as not only an upload terminal of a picture but also a browse entrance of a picture of the thumbnail, so can the mobile terminal. Those skilled in the art will appreciate that, in fact, each terminal (e.g., the PC side or the mobile terminal) in the embodiment of the present disclosure can serve as not only an image provider to provide the server side with the original image, the authorized accesses address or the like, but also an image accessor to display the thumbnail or the relevant information, to access the original image, and to transact the original image. Specifically, the relevant information may include various information measures capable of representing a feature of the original image except for that the original image is represented in the form of the thumbnail, e.g., text introduction, audio introduction, etc. The relevant information may correspond to the thumbnail.

For the convenience of description, the subsequent embodiments of the present disclosure assume that the device 10 is an image providing device, the server side 20 is a transaction server, and the terminal 30 is an image purchasing terminal. Other application scenarios may refer to this application scenario.

Figure 3:
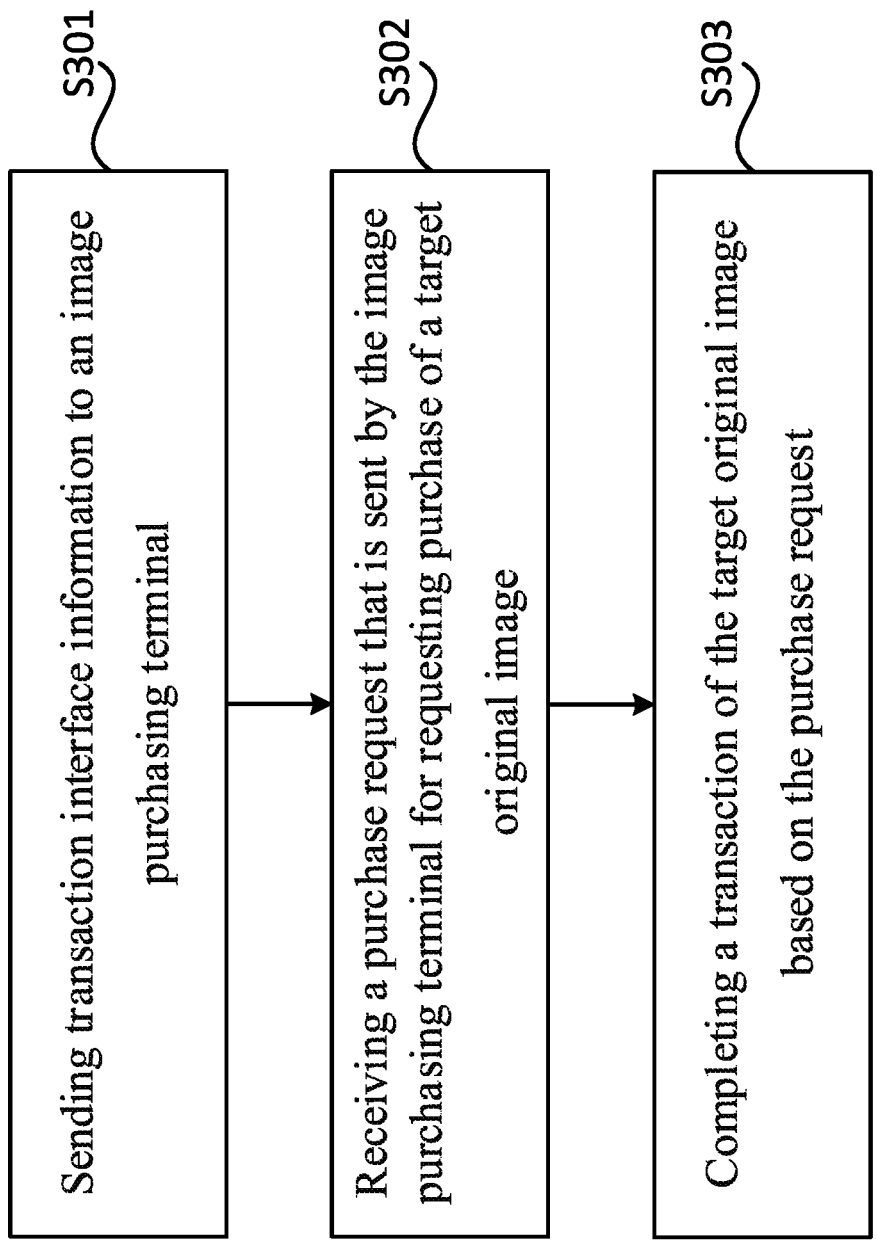
FIG. 3 is a schematic view of main processes of a method for image transaction according to an embodiment of the present disclosure.

The following will describe a method for image transaction of an embodiment of the present disclosure. The method for image transaction is applied to a transaction server in a system for image transaction. The transaction server provides image purchase services. FIG. 3 is a schematic view of main processes of a method for image transaction according to the embodiment of the present disclosure. The method for image transaction includes the following main steps.

In S301, transaction interface information is sent to an image purchasing terminal.

The transaction server can output the transaction interface information through a GUI (Graphical User Interface) displayed by a display screen of the image purchasing terminal. The transaction interface information includes data of at least one thumbnail to be displayed by the image purchasing terminal. Each thumbnail corresponds to one original image. The data of the thumbnail include a thumbnail of the original image, and may further include relevant information for representing a feature of the original image. The relevant information may be obtained from the content of the thumbnail. The image purchasing terminal will display a transaction interface based on the transaction interface information. There is at least one thumbnail is displayed on the transaction interface, and the relevant information may also be displayed on the transaction interface.

In S302, a purchase request that is sent by the image purchasing terminal for requesting purchase of a target original image is received.

The purchase request may be regarded as an access request for the target original image, which denotes that a user wants to acquire the target original image by purchasing. The target original image corresponds to a target thumbnail. The target thumbnail is one of the at least one thumbnail.

In S303, a transaction of the target original image is completed based on the purchase request.

In the method for image transaction provided by the present disclosure, the transaction server can output the transaction interface information through the image purchasing terminal, and complete the transaction of the target original image after receiving the purchase request that is sent by the image purchasing terminal for requesting purchase of the target original image. In this way, the user does not need to go to museums, galleries, arts centers or the like to buy image works. Thus, the transaction efficiency of the image works can be improved.

The followings will specifically describe a method for image transaction of an embodiment of the present disclosure. In the embodiment of the present disclosure, transaction data provided by a transaction server may be data of a target original image or an authorized access path of the target original image. The authorized access path of the target original image is a path authorized to acquire the target original image.

Figure 4:
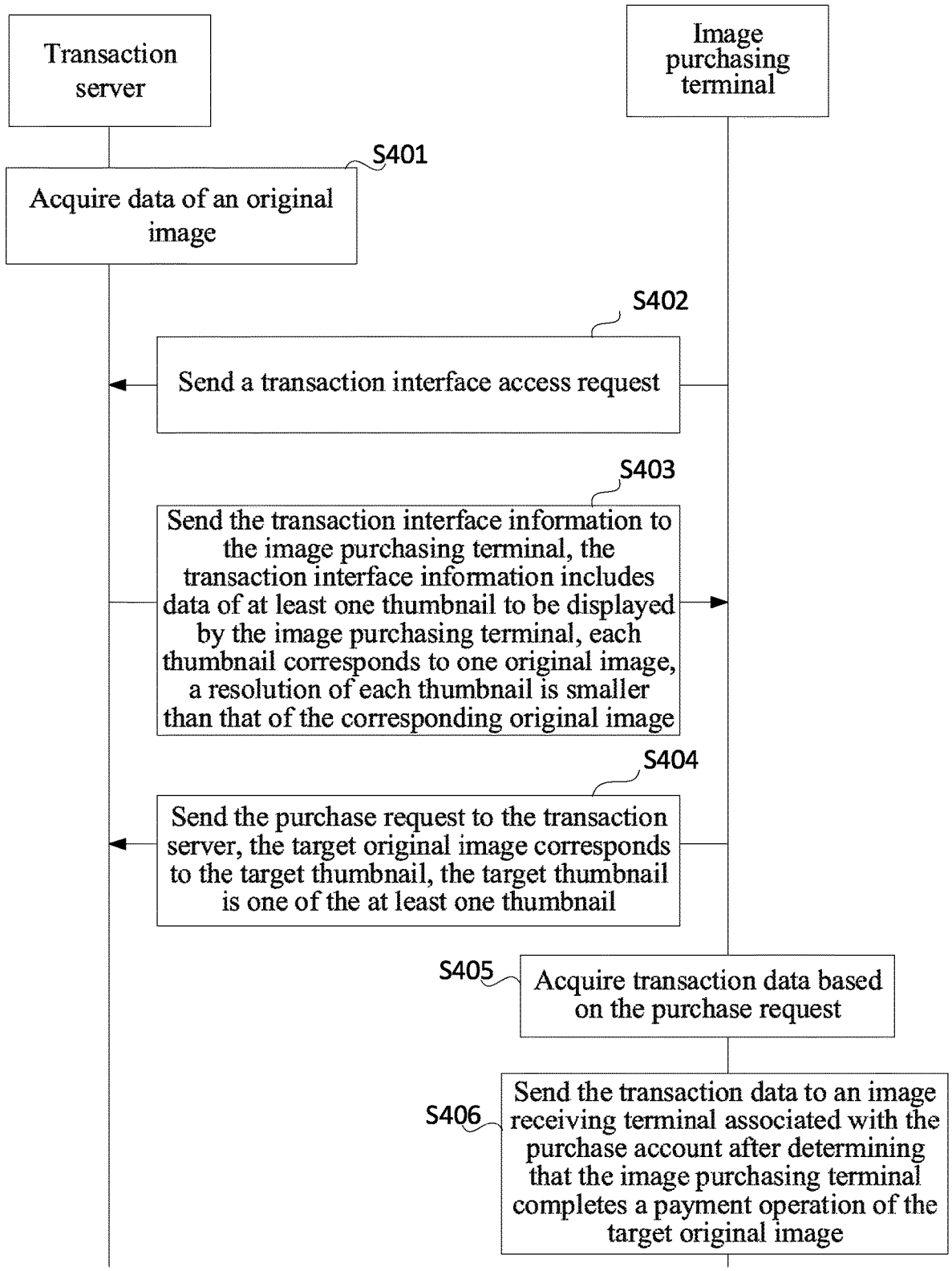
FIG. 4 is a schematic flow chart of a method for image transaction according to an embodiment of the present disclosure.

In some embodiments, the transaction data are the data of the target original image. The method for image transaction may be applied to the system for image transaction as shown in FIG. 1 or FIG. 2. FIG. 4 is a schematic flow chart of the method for image transaction. The method for image transaction includes the following steps.

In S401, the transaction server acquires data of an original image.

The data of a plurality of original images are stored in the transaction server. These original images are images for transaction.

For example, the transaction server is maintained by a corresponding image transaction service provider, and the data of the original images, stored in the transaction server, are provided by the image transaction service provider. In this case, an architecture of the system for image transaction may be as shown in FIG. 1. The image transaction service provider can input the data of the plurality of original image into the transaction server through an input/output interface of the transaction server.

For example, the transaction server provides image sale services. In this case, an architecture of the system for image transaction may be as shown in FIG. 2. The transaction server is connected to at least one image providing device through communication. The plurality of original images in the transaction server is provided by the at least one image providing device. The revenue from the transaction may be owned by the image providing device in whole or in part according to an agreement.

For example, part of the data of the original image stored in the transaction server is provided by the image transaction service provider, and the other part thereof is provided by the image providing device. In this case, an architecture of the system for image transaction may be as shown in FIG. 2.

Figure 5:
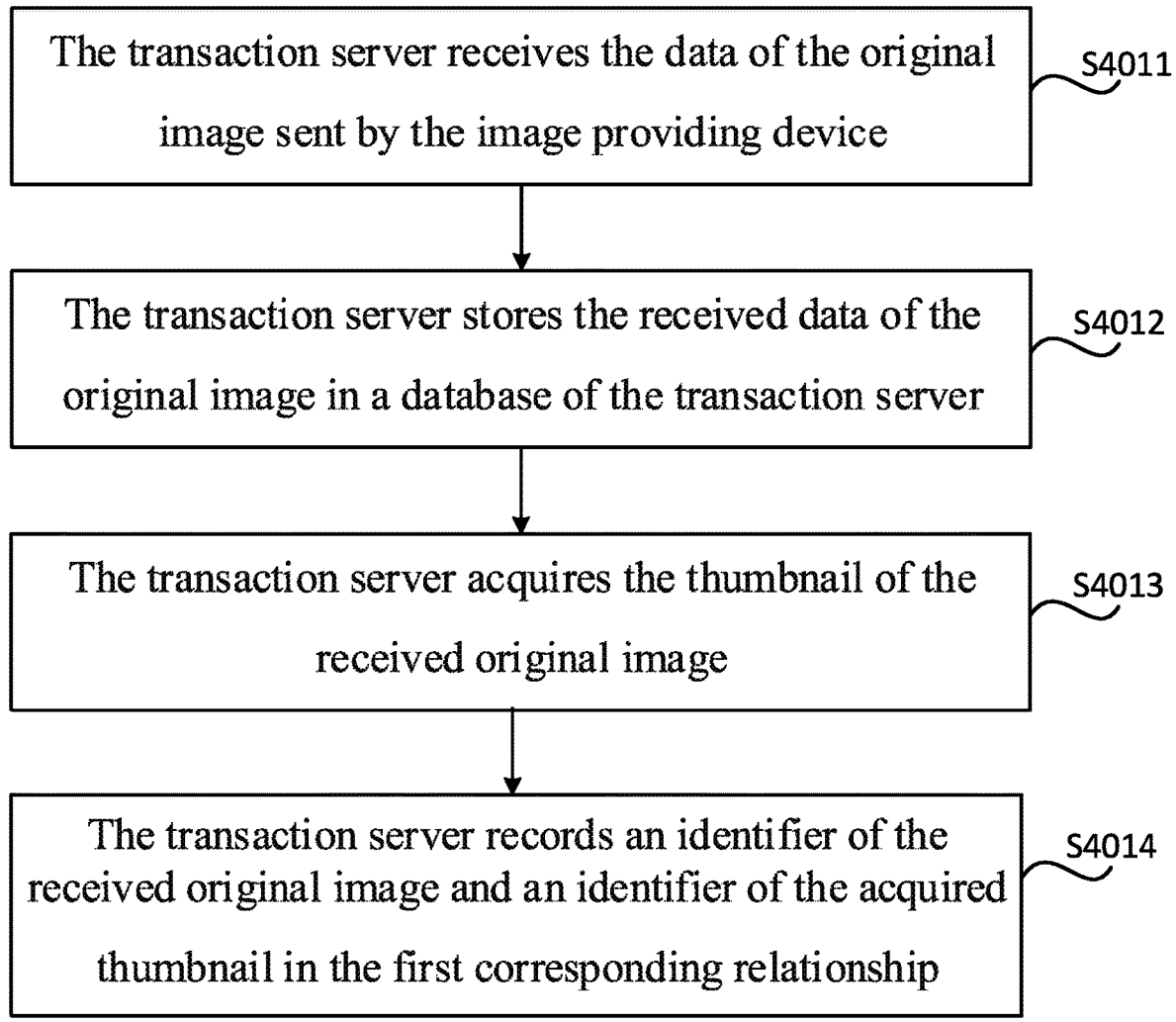
FIG. 5 is a schematic flow chart of a method for acquiring data of an original image according to an embodiment of the present disclosure.

The embodiment of the present disclosure takes that the system for image transaction includes the image providing device as an example to illustrate the process that the transaction server acquires the data of the original image provided by the image providing device. The process that the transaction server acquires the data of the original image provided by the image transaction service provider, may refer to the first optional implementation in the foregoing S401, which will not be repeated in the embodiment of the present disclosure. As shown in FIG. 5, step S401 may include the following sub-steps.

In S4011, the transaction server receives the data of the original image sent by the image providing device.

A network address of the transaction server may be pre-stored in the image providing device. When there is an original image required to be sold, the data of the original image are sent to the transaction server based on the network address. Correspondingly, the transaction server receives the data of the original image.

In S4012, the transaction server stores the received data of the original image in a database of the transaction server.

The transaction server may directly store the received data of the original image in the database of the transaction server. However, there may be the case where the data of a plurality of identical original images are stored repeatedly.

For example, in some possible cases, for the purpose of publicity, public benefit or the like, painters, photographers, small picture agencies or the like may provide their own image works for museums, galleries, arts centers or the like. This will result in that different holders of the image works are likely to own the same image works.

For example, for the purpose of publicity, a photographer Wang holding photography works A may provide the photography works A for a museum W, such that the museum W can exhibit the photograph works A. In this case, the two different image works holders, the museum W and the photographer Wang, will have the same image works, namely, the photography works A.

When the different image works holders have the same image works, there may be the case where different image providing devices upload the same original image or thumbnail to the transaction server.

In consideration that the different image providing devices may upload the same original image to the transaction server, to relieve the storage burden, the transaction server can deduplicate the original image uploaded by the image providing device. That is, whether historical data identical to the received data of the original image exist in data stored in the database is inquired. If yes, the data storage process may be executed as follows.

When the historical data identical to the received data of the original image are stored in the database, the received data of the original image are redirected to the historical data. A second corresponding relationship between the historical data and an identifier of the received original image is stored in the database of the transaction server. The second corresponding relationship is used to acquire the historical data based on the identifier of the received original image for the transaction server.

Redirecting is a method used in the storage technology to save storage space. For the same files F1 and F2, the storage operation is only performed when a file entity F1 is stored in the memory, and a file entity F2 can be stored by directing the memory address of the file entity F2 to the memory address of the file entity F1.

Exemplarily, in one way, the transaction server can acquire a message-digest algorithm 5 (MD5) digital digest of the original image after receiving the original image uploaded by the image providing device. Afterwards, the transaction server can compare the MD5 digital digest of the original image with an MD5 digital digest of the stored historical data. When there exits the original image of which the MD5 digital digest is the same as that of the received original image, the transaction server determines that the historical data identical to the data of the received original image are stored in the database, and the historical data are the original image of which the MD5 digital digest is the same as that of the received original image. When there does not exist the original image of which the MD5 digital digest is the same as that of the received original image, the transaction server determines that the historical data identical to the data of the received original image are not stored in the database. After the MD5 is executed on a character string, a file or a package, a string with a fixed length of 128 bit can be generated. If someone modifies a source file, a new string will be generated. The MD5 can be used for consistency check, digital signature or safety access certification.

In another way, the transaction server can receive identification information of the original image sent by the image providing device before receiving the original image uploaded by the image providing device. The identification information can uniquely identify an original image, and for example, may be an MD5 digital digest or the like.

The transaction server can compare the identification information of the received original image with identification information of an historical image in the database after receiving the identification information of the received original image. When there exists the historical image of which the identification information is the same as that of the received original image, the transaction server determines that the historical data identical to the data of the received original image are stored in the database, and the historical data are historical data of which identification information are the same as the identification information of the received original image. When there does not exist the historical data of which the identification information is the same as that of the target original image, the transaction server determines that the historical data identical to the data of the received original image are not stored in the database.

Thus, when the same image data are stored in the transaction server, the data are deduplicated by redirecting, such that occupation of the storage space is reduced and a utilization ratio of the database is improved.

In S4013, the transaction server acquires the thumbnail of the received original image.

The transaction server can acquire the thumbnail of the received original image in various ways. In the first way, the transaction server can generate the thumbnail based on the received data of the original image. In another way, the image providing device generates the thumbnail based on the data of the original image and sends it to the transaction server. The transaction server directly receives the thumbnail. It is worth noting that the image providing device can send the data and the thumbnail of the original image to the transaction server by means of the same message to reduce the network overhead. In consideration that different image providing devices may upload the same thumbnail to the transaction server, to reduce the storage burden, the transaction server can deduplicate the thumbnail uploaded by the image providing device.

The technical process that the transaction server deduplicates the thumbnail uploaded by the image providing device is similar to the technical process that the transaction server deduplicates the original image uploaded by the image providing device, and therefore, it will not be repeated in the embodiment of the present disclosure.

In yet another way, when deduplicating is performed before S4012 and there exist the historical data identical to the received data of the original image, the transaction server can directly take the thumbnail of the historical data as the thumbnail of the received original image. A resolution of the thumbnail is smaller than that of the received original image. It is worth noting that the transaction server or the image providing device can generate a plurality of thumbnails for each original image. The plurality of thumbnails corresponds to resolutions of different types of terminals.

In some possible implementations, in consideration of the convenience in retrieval, the transaction server can store the original image and the thumbnail through classification. For example, the transaction server can store the original image in a first storage region and store the thumbnail in a second storage region.

For example, the transaction server can store the thumbnail in one or more storage servers, and meanwhile, can store the original image in one or more other storage servers.

For example, a reading speed of a memory in the second storage region is higher than that of a memory in the first storage region.

In S4014, the transaction server records an identifier of the received original image and an identifier of the acquired thumbnail in the first corresponding relationship.

The first corresponding relationship is a corresponding relationship between the identifier of the thumbnail and the identifier of the original image. The identifier of the original image may be allocated by a device that generates the original image and may also be carried in the original image during the generation of the thumbnail. Similarly, the identifier of the thumbnail may be allocated by a device that generates the thumbnail and may also be carried in the thumbnail during the generation of the thumbnail.

In S402, the image purchasing terminal sends a transaction interface access request to the transaction server.

When accessing the transaction server, the image purchasing terminal can send the transaction interface access request to the transaction server. The transaction interface access request is used for requesting acquisition of transaction interface information.

In S403, the transaction server sends the transaction interface information to the image purchasing terminal. The transaction interface information includes data of at least one thumbnail to be displayed by the image purchasing terminal. Each thumbnail corresponds to one original image. A resolution of each thumbnail is smaller than that of the corresponding original image.

After receiving the transaction interface access request, the transaction server correspondingly generates the transaction interface information. In one implementation, the transaction server directly generates the transaction interface information in a preset manner. This preset manner is fixed. In another implementation, the transaction serve may acquire a thumbnail that matches the resolution of the display screen of the image purchasing terminal at first, and then generates the transaction interface information. The transaction interface information includes data of the thumbnail that matches the resolution of the display screen. The resolution may be carried in the transaction interface access request, and may also be acquired by the transaction server during the registration of the image purchasing terminal. In this way, since the thumbnail in the transaction interface information matches the resolution of the display screen, when the image purchasing terminal displays the transaction interface information, the thumbnail may not be deformed and can be conveniently viewed by the user. Thus, the user experience is improved.

In S404, the image purchasing terminal sends the purchase request to the transaction server. The target original image corresponds to the target thumbnail. The target thumbnail is one of the at least one thumbnail.

The image purchasing terminal can display the at least one thumbnail based on the transaction interface information after receiving the transaction interface information. When a plurality of thumbnails is displayed, they are displayed in a side-by-side or rolling manner. The user can browse the thumbnail displayed by the image purchasing terminal and select the target thumbnail corresponding to the target original image that the user wants to buy through a touch operation, a hardware button triggering operation or the like. Correspondingly, the image purchasing terminal generates the purchase request for requesting purchase of the target original image.

In S405, the transaction server acquires transaction data based on the purchase request.

Exemplarily, the transaction data are data of the target original image. The transaction interface information includes an identifier of at least one thumbnail. The purchase request includes an identifier of the target thumbnail. The data of the target original image are locally acquired in the transaction server. Correspondingly, the acquisition process of the transaction data may include the following steps.

In A1, the transaction server inquires a first corresponding relationship based on the identifier of the target thumbnail in the purchase request to obtain the identifier of the target original image corresponding to the identifier of the target thumbnail.

The first corresponding relationship is used for recording the corresponding relationship between the identifier of the thumbnail and the identifier of the original image, and it may be the first corresponding relationship in S4014.

In A2, the transaction server acquires data of the target original image corresponding to the identifier of the target original image from the database of the transaction server.

The identifier of the target original image and the data of the target original image are correspondingly stored in the database of the transaction server. In one example, the transaction server can inquire a corresponding relationship between the identifier of the target original image and the data of the target original image based on the identifier of the target original image, and directly acquire the corresponding data of the target original image. In another example, referring to the above S4012, when the transaction server stores the data of the original image, deduplicating is performed. Thus, the transaction server fails to obtain the data of the target original image from the foregoing corresponding relationship through inquiry and can acquire historical data identical to the data of the target original image by inquiring the second corresponding relationship.

In S406, the transaction server sends the transaction data to an image receiving terminal associated with the purchase account after determining that the image purchasing terminal completes a payment operation of the target original image.

The transaction server can provide a payment interface for the image purchasing terminal after receiving the purchase request sent by the image purchasing terminal. After the image purchasing terminal correspondingly pays for the target original image through the payment interface, the transaction server sends the transaction data to the image receiving terminal associated with the purchase account.

In the embodiment of the present disclosure, the data of the plurality of original images provided by the transaction server are different in price. For example, the data of some original images are free image data. That is, they are zero in price, and the actual payment made through the payment operation is 0. The data of some original images are pay image data. That is, they are not zero in price, and the payment is made through the payment operation.

Further, if the data of the target original image are the free image data, the transaction server can directly provide the transaction data after receiving the purchase request corresponding to the target thumbnail to complete a transaction of the target original image. In this case, the transaction server may not provide the payment interface for the image purchasing terminal.

Optionally, the process of sending the transaction data to the image receiving terminal associated with the purchase account includes the following steps.

B1, the transaction server encrypts the transaction data through a secret key. The secret key is at least one of a transaction number and an identifier of the image purchasing terminal. The transaction number is generated after the image purchasing terminal completes the payment operation of the target original image.

Usually, when the target original image is the original image free for use, the transaction server may encrypt the target original image by the identifier of the image purchasing terminal.

When the target original image is not the original image free for use, the transaction server may encrypt the target original image by the transaction number.

Optionally, the transaction data can be encrypted through the secrete key in accordance with an encryption algorithm.

The encryption algorithm is one of a two-dimensional discrete Fourier transformation algorithm and a two-dimensional discrete cosine transform algorithm.

In B2, the transaction server provides the encrypted transaction data for the image receiving terminal.

The image receiving terminal is one of the followings.

First, the image receiving terminal is a terminal logged in with the purchase account, namely, the image purchasing terminal.

Second, the image receiving terminal is a display terminal bound to the purchase account, for example, an electronic device bound to the purchase account and used to display the digital image works. The electronic device may be a digital picture frame (also known as electronic picture screen). The digital picture frame may have a resolution of more than or equal to 1,920*1,080 and a size of more than or equal to 32 inches, such that the digital image works can be displayed clearly. Thus, the digital image works is effectively exhibited.

Third, the image receiving terminal is a terminal logged in with an account associated with the purchase account, for example, a terminal logged in with a friend account associated with the purchase account. The friend account may be an account registered on the transaction server and may also be a third-party account provided by other instant messaging platforms. In this way, the image purchasing terminal can determine the image receiving terminal in accordance with its own needs. The transaction server sends the transaction data to the image receiving terminal, such that a user of the image receiving terminal can acquire the target original image. Thus, a bestowal or substituted transaction function of the target original image (the function that the image purchasing terminal pays for the transaction of the image receiving terminal) can be achieved, enriching the function of the system for image transaction.

In the method for image transaction provided by the present disclosure, the transaction server can output the transaction interface information through the image purchasing terminal, and send the data of the target original image to the image receiving terminal after receiving the purchase request that is sent by the image purchasing terminal for requesting purchase of the target original image, to complete the transaction of the target original image. In this way, the user does not need to go to museums, galleries or arts centers to buy image works. Thus, the transaction efficiency of the image works can be improved.

Figure 6:
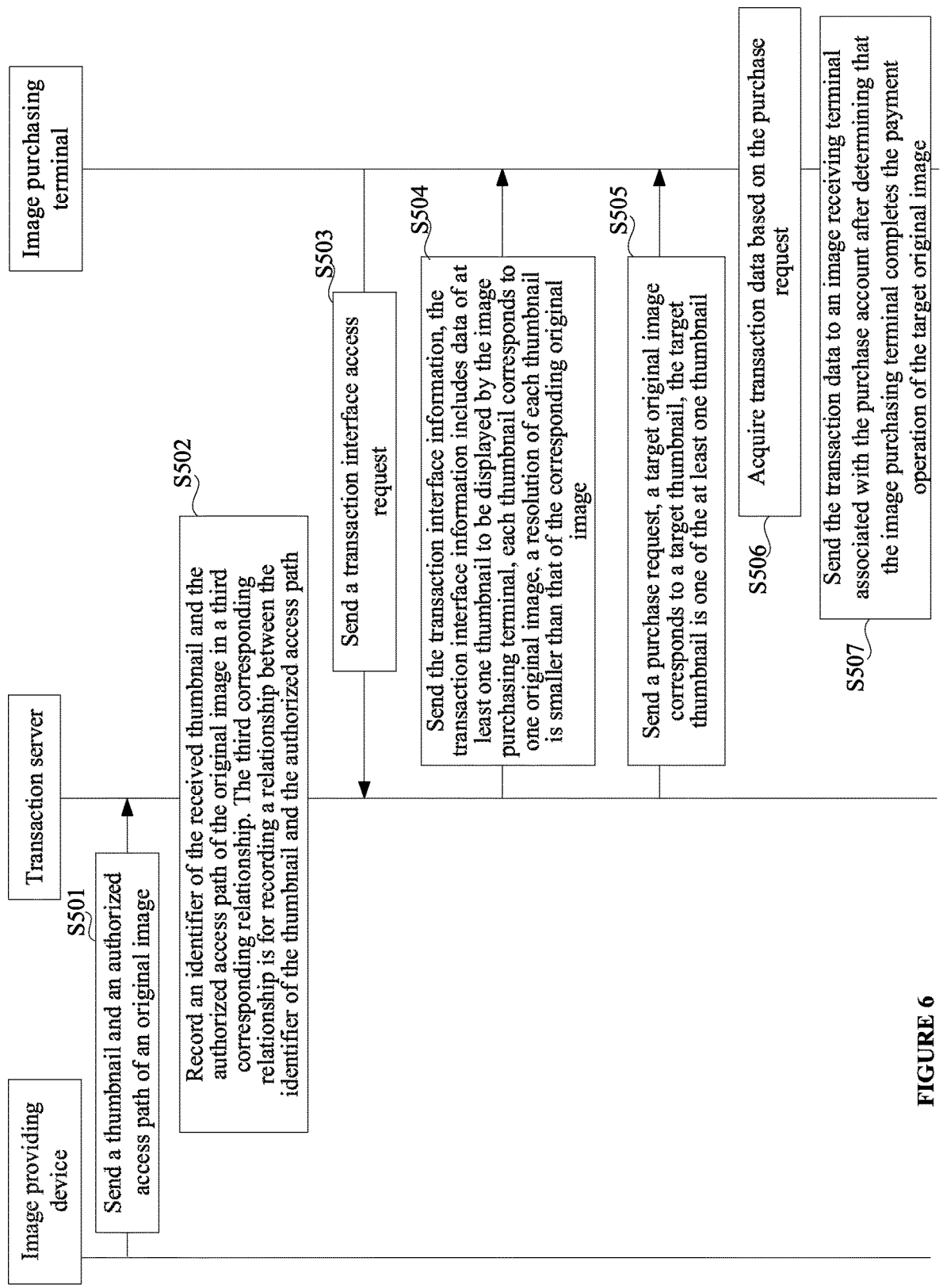
FIG. 6 is a schematic flow chart of a method for image transaction according to an embodiment of the present disclosure.

In a second optional implementation, the transaction data are data of the target original image. The method for image transaction can be applied to the system for image transaction as shown in FIG. 2. FIG. 6 is a schematic flow chart of the method for image transaction. The method for image transaction includes the following steps.

In S501, an image providing device sends a thumbnail and an authorized access path of an original image to a transaction server.

In the second optional implementation, the transaction server also provides image sale services. In this case, an architecture of the system for image transaction may be as shown in FIG. 2. The system for image transaction may include at least one image providing device. The at least one image providing device provides the authorized access path of the original image for the transaction server, such that the transaction server can acquire the original image from the image providing device when a user buys the original image. The revenue from a transaction of the original image is at least partially owned by the image providing device. In this way, the transaction server only stores the corresponding authorized access path without the need of pre-storing the data of the original image. A data volume of the authorized access path is far less than that of the original image. Thus, occupation of the storage space of the transaction serve is effectively reduced.

Besides, since the transaction server does not acquire the original image in advance, the thumbnail of the original image can be generated by the image providing device based on the data of the original image. And, the transaction server only needs to directly receive the thumbnail. It is worth noting that the image providing device can send both the thumbnail and the authorized access path of the original image to the transaction server by means of the same message to reduce the network bandwidth overhead. As stated above, the image providing device can generate a plurality of thumbnails with different resolutions for each original image.

In S502, the transaction server records an identifier of the received thumbnail and the authorized access path of the original image in a third corresponding relationship. The third corresponding relationship is for recording a relationship between the identifier of the thumbnail and the authorized access path.

In S503, the image purchasing terminal sends a transaction interface access request to the transaction server.

The image purchasing terminal can send the transaction interface access request to the transaction server when accessing the transaction server. The transaction interface access request is for requesting acquisition of transaction interface information.

In S504, the transaction server sends the transaction interface information to the image purchasing terminal. The transaction interface information includes data of at least one thumbnail to be displayed by the image purchasing terminal. Each thumbnail corresponds to one original image. A resolution of each thumbnail is smaller than that of the corresponding original image.

The process of S504 may refer to S403, and therefore, will not be repeated in the embodiment of the present disclosure.

In S505, the image purchasing terminal sends a purchase request to the transaction server. A target original image corresponds to a target thumbnail. The target thumbnail is one of the at least one thumbnail.

The process of S505 may refer to S404, and therefore, will not be repeated in the embodiment of the present disclosure.

In S506, the transaction server acquires transaction data based on the purchase request.

In the embodiment of the present disclosure, the transaction data may be data of the target original image. The transaction interface information includes an identifier of at least one thumbnail. The purchase request includes an identifier of the target thumbnail. The transaction server can acquire the data of the target original image from the image providing device. Correspondingly, the process of acquiring the transaction data may include the following steps.

In C1, the transaction server inquires a third corresponding relationship based on the identifier of the target thumbnail in the purchase request to obtain the authorized access path of the target original image. The authorized access path includes an access permission and a data acquisition address.

Exemplarily, the access permission is for authentication of a requester side for acquiring the data of the target original image. For example, the access permission may be a digital certificate. The data acquisition address may be a URL (Uniform Resource Locator). The image providing device capable of providing the data of the target original image may be accessed through the URL.

For example, the authorized access path may be present as a TLS/SSL-encrypted HTTPS link.

In C2, the transaction server sends a data acquisition request to the image providing device indicated by the data acquisition address. The data acquisition request includes the access permission.

After receiving the data acquisition request, the image providing device can acquire the access permission in the request and perform authentication of the transaction server based on the acquired access permission. The authentication may include: comparing the acquired access permission with at least one access permission issued by the image providing device, and determining that the authentication is successful when an access permission identical to the acquired access permission exists in the at least one access permission issued by the image providing device. Since the access permission is generated by the image providing device based on the original image to be sold, the image providing device can inquire the data of the original image corresponding to the access permission of which the authentication is successful, take the inquired data as data of the target original image and send them to the transaction server.

The above-mentioned authentication process is merely an example. Other authentication means, for example, a server-client access authentication based on symmetric encryption, asymmetric encryption, etc., are applicable to the present disclosure.

In C3, the transaction server receives the data of the target original image sent by the image providing device based on the access permission.

In S507, the transaction server sends the transaction data to an image receiving terminal associated with the purchase account after determining that the image purchasing terminal completes the payment operation of the target original image.

S507 may refer to S406, and therefore, will not be repeated in the present disclosure.

In the method for image transaction provided by the present disclosure, the transaction server can output the transaction interface information through the image purchasing terminal, and send the data of the target original image to the image receiving terminal after receiving the purchase request that is sent by the image purchasing terminal for requesting purchase of the target original image to complete the transaction of the target original image. In this way, the user does not need to go to museums, galleries or arts centers to buy image works. Thus, the transaction efficiency of the image works can be improved.

Figure 7:
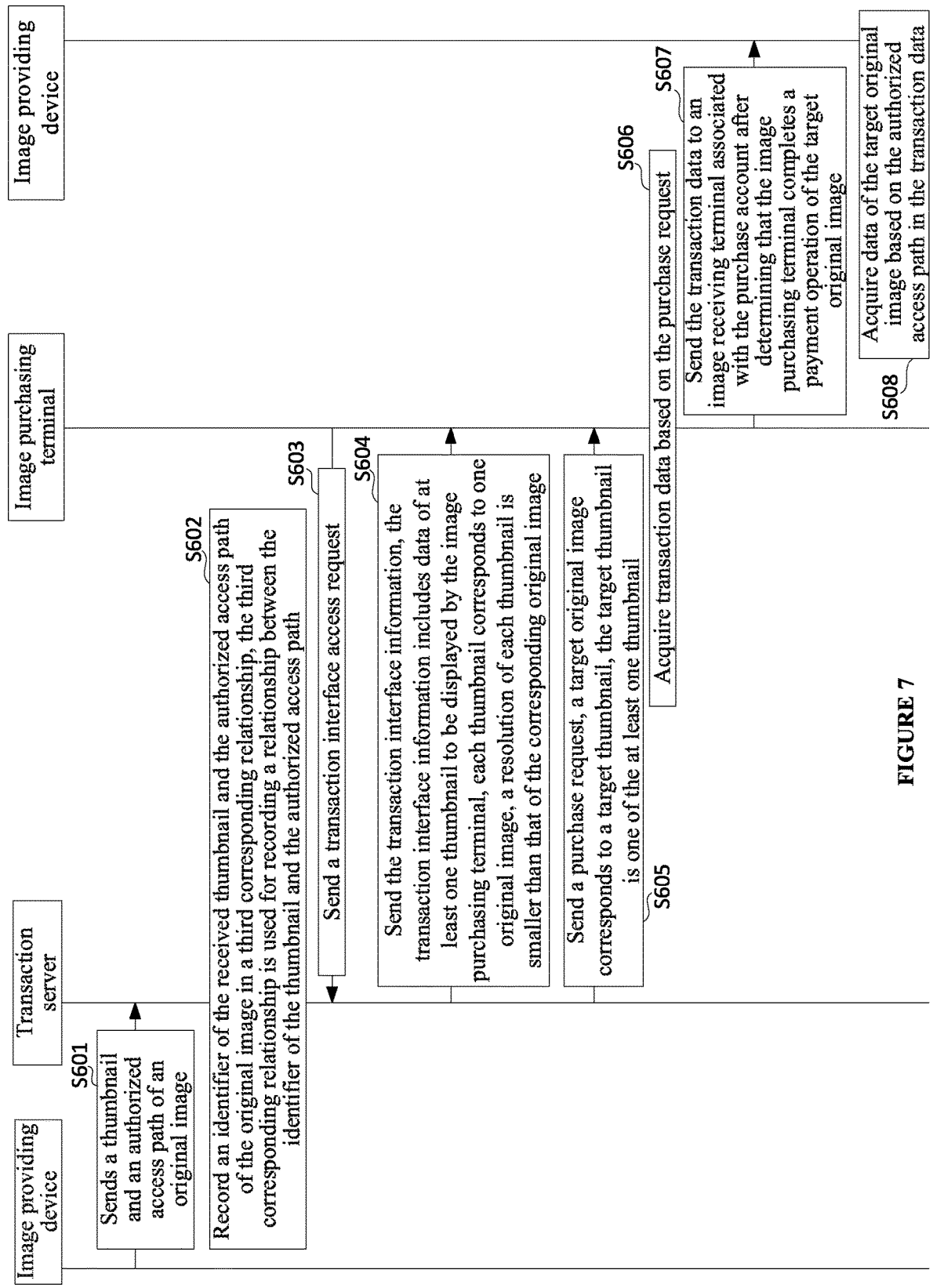
FIG. 7 is a schematic flow chart of a method for image transaction according to an embodiment of the present disclosure.

In a third optional implementation, the transaction data is an authorized access path of, the target original image. The method for image transaction can be applied to the system for image transaction as shown in FIG. 2. FIG. 7 is a schematic flow chart of the method for image transaction. The method for image transaction includes the following steps.

In S601, an image providing device sends a thumbnail and an authorized access path of an original image to a transaction server.

The process of S601 may refer to S501, and therefore, will not be repeated in the embodiment of the present disclosure.

In S602, the transaction server records an identifier of the received thumbnail and the authorized access path of the original image in a third corresponding relationship. The third corresponding relationship is used for recording a relationship between the identifier of the thumbnail and the authorized access path.

The process of S602 may refer to S502, and therefore, will not be repeated in the embodiment of the present disclosure.

In S603, the image purchasing terminal sends a transaction interface access request to the transaction server.

The image purchasing terminal may send the transaction interface access request to the transaction server when accessing the transaction server. The transaction interface access request is for requesting acquisition of transaction interface information.

In S604, the transaction server sends the transaction interface information to the image purchasing terminal. The transaction interface information includes data of at least one thumbnail to be displayed by the image purchasing terminal. Each thumbnail corresponds to one original image. A resolution of each thumbnail is smaller than that of the corresponding original image.

The process of S604 may refer to S403, and therefore, will not be repeated in the embodiment of the present disclosure.

In S605, the image purchasing terminal sends a purchase request to the transaction server. A target original image corresponds to a target thumbnail. The target thumbnail is one of the at least one thumbnail.

The process of S605 may refer to S404, and therefore, will not be repeated in the embodiment of the present disclosure.

In S606, the transaction server acquires transaction data based on the purchase request.

In the embodiment of the present disclosure, the transaction data may be the authorized access path of the target original image. The transaction inter ace information includes an identifier of the at least one thumbnail. The purchase request includes an identifier of the target thumbnail. Correspondingly, the process of acquiring the transaction data may include the following steps The transaction server inquires a third corresponding relationship between the identifier of the thumbnail and the authorized access path based on the identifier of the target thumbnail in the purchase request, to obtain the authorized access path of the target original image.

In S607, the transaction server sends the transaction data to an image receiving terminal associated with the purchase account after determining that the image purchasing terminal completes a payment operation of the target original image.

S607 may refer to S507, and therefore, will not be repeated in the present disclosure.

In S608, the image receiving terminal acquires data of the target original image based on the authorized access path in the transaction data.

Since the image receiving terminal does not directly acquire the data of the target original image, the data of the target original image need to be acquired based on the authorized access path. In one example, the authorized access path of the target original image may include an access permission and a data acquisition address. The process that the image receiving terminal acquires the data of the target original image may refer to the process of S506 that the transaction server acquires the data of the target original image. In another example, the authorized access path of the target original image may only include the access permission. A code scanning device connected to the image providing device can provide the data of the target original image by reading the access permission. The access permission may be a QR code. For example, when a user of the image receiving terminal wants to acquire the data of the target original image, he/she can go to the place where the image providing device is and show the access permission. Then, the code scanning device connected to the image providing device reads the access permission for an authentication. Referring to the above-mentioned authentication process for this authentication process. After the authentication is successful, the image providing device transmits the data of the target original image to the image receiving terminal by the means of near field communication or other wireless communications.

In the method for image transaction provided by the present disclosure, the transaction server can output the transaction interface information through the image purchasing terminal, and send the data of the target original image to the image receiving terminal after receiving the purchase request that is sent by the image purchasing terminal for requesting purchase of the target original image to complete the transaction of the target original image. In this way, the user does not need to go to museums, galleries or arts centers to buy image works and only needs go to the image providing device to acquire the data of the target original image later. Thus, the transaction efficiency of the image works can be improved The method for image transaction provided by the present disclosure draws both the image accessor and the provider of the original image into consideration. By displaying the thumbnail or relevant information of the original image, on one hand, the demand for quickly and conveniently reading interested images of the image accessor is met, and on the other hand, it solves the technical problem that the sales of artistic works is greatly limited because there lacks a mature communication trading method between the consumers and the holders of the works.

Further, in the foregoing three optional implementations, under the circumstance that the image providing device is the terminal, the terminal can provide the original image or the authorized access address thereof for the transaction server.

Since the terminal may serve as the image provider and uploads the original image through an upload channel, the transaction server as an image receiver may be in such a situation: some individual painters or galleries may, for the sake of public benefit or publicity, provide their images to image museums and other institutions in addition to uploading images through the upload channel by themselves, and these institutions transmit the original images to the image receiver through the upload channel or provide the relevant information and the authorized access address of the original image to be exhibited for the image receiver. Thus, based on the technical solution provided by the embodiment of the present disclosure, an on-line service method that meets personalized demands of the image providers may be simultaneously provided for these image providers with different specifications and sizes, including the individual painters, galleries, image museums, etc.

In the embodiment of the present disclosure, two different picture information upload channels are provided for the image providing device. One is for uploading entity images and the other is for uploading addresses and information of mapped entity images. Storage space is allocated respectively for the two difference upload channels. Owing to this design, on one hand, classified storage is realized to improve the retrieval and management efficiency. On the other hand, it is applicable to some institutions that expect to indirectly provide a transaction window by means of licensing out. For example, in consideration of such factors as copyright permission, such large-scale institutions as image suppliers and image art museums prefer external services by authorized accessing.

Further, in the foregoing three optional implementations, the transaction server receives the original image or the authorized access address provided by the image provider and generates the data of the thumbnail of the corresponding original image. The data of the thumbnail include the thumbnail and may also include the relevant information.

Optionally, in S401, when receiving the original image which is uploaded by the image provider through the upload channel, the transaction server stores the original image in the first storage region and generates the corresponding thumbnail. The generated thumbnail corresponds to a resolution of a common mobile device.

In S501 or S601, when receiving the relevant information (e.g., the thumbnail) and the authorized access address of the original image which are uploaded by the image provider through the authorized access channel, the transaction server stores the relevant information and the authorized access address in the second storage region. And, the authorized access channel is established between the relevant information and the authorized access address in accordance with the relevant information and the authorized access address by the transaction server.

The inventor of the present disclosure discovered that different image providers may upload the same image. For this phenomenon, the inventor deduplicates the received original image in S4012, or, deduplicates the received relevant information in S501 or S601. It should be noted that since the authorized access address may be generated by the image providing devices with different permissions, it has certain privacy. Thus, the authorized access address is usually not deduplicated.

By means of deduplication, that different image providers may provide the same image is avoided which improves the storage efficiency. Targeted deduplications are performed on different uploaded information such that the image deduplication becomes simple and efficient, and the storage burden is reduced. Further, the execution efficiency of the method for image transaction is improved.

Figure 8:
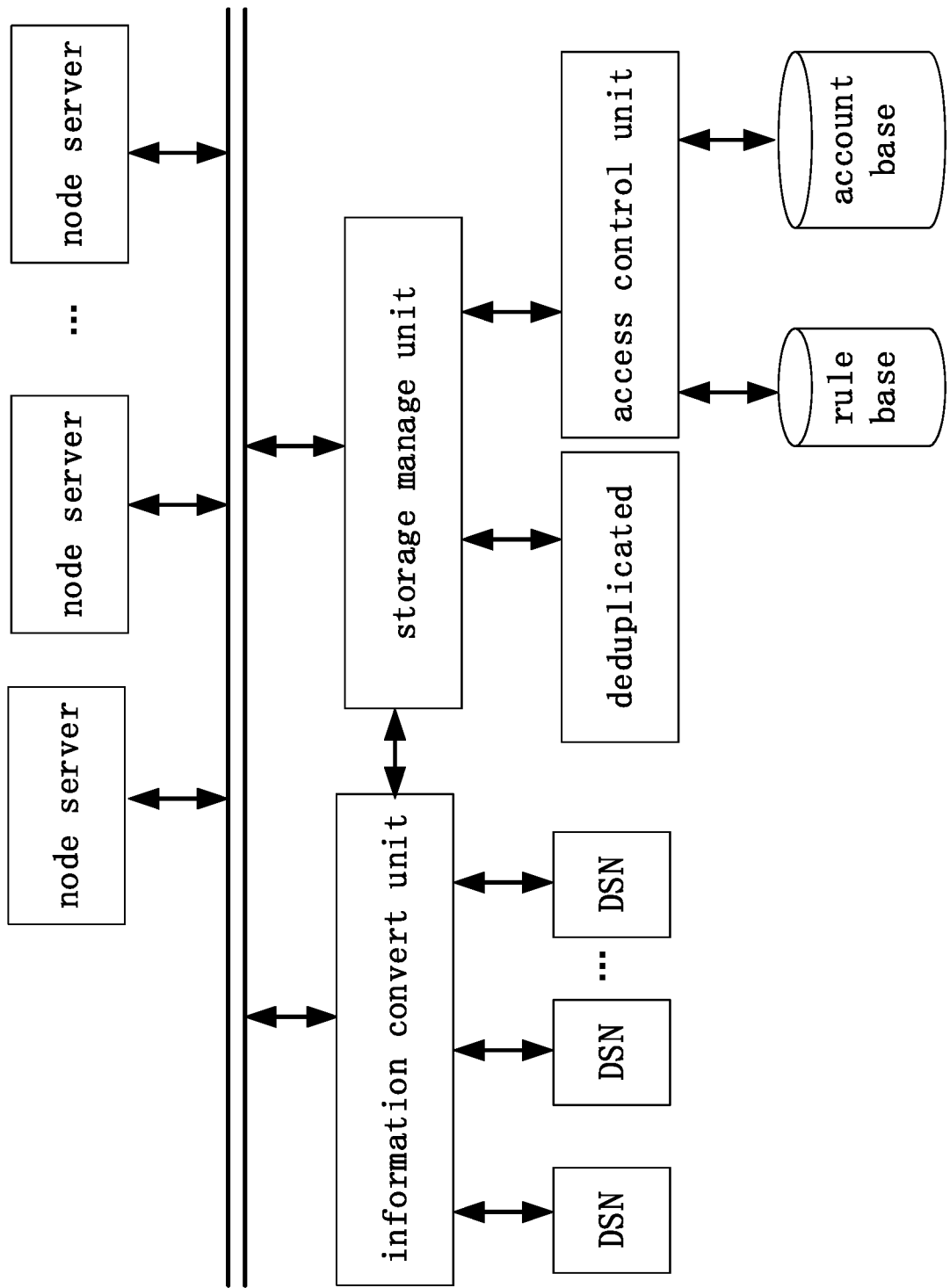
FIG. 8 is a schematic view of a logical architecture of a method for image transaction according to an embodiment of the present disclosure.

To make a reader conveniently understand the technical solution provided by the embodiment of the present disclosure, embodiments of the present disclosure will briefly describe each virtual module included in the transaction server in the following:

As shown in FIG. 8, the transaction server may include a plurality of DSNs (Data Storage Nodes), a storage manage unit, an information convert unit, a deduplicated unit, an access control unit, a rules base and an account base.

The plurality of DSNs is the database of the transaction server and used to store data of the original image, the thumbnail, the authorized access path, etc. in a classified manner.

The information convert unit is used to acquire the MD5 digital digest of the original image or the thumbnail stored in the DSNs.

The deduplicated unit is used to deduplicate the original image or the thumbnail stored in the DSNs in accordance with the MD5 digital digest acquired by the information convert unit.

The access control unit is used to perform an authentication of the image purchasing terminal, the image providing device and the image receiving terminal in accordance with the account data stored in the account database.

The access control unit is also used to provide the data of the original image that corresponds to a certain thumbnail of which the transaction is completed for the image receiving terminal in accordance with the information whether the original image corresponding to the certain thumbnail stored in the rule base is stored in the database.

The storage manage unit is used to control and manage the information convert unit, the deduplicated unit and the access control unit.

As shown in FIG. 8, the transaction server can exhibit a plurality of node servers to the image purchasing terminal. The plurality of node servers corresponds to the plurality of DSNs. The transaction server may also abstract the plurality of node servers into one node server in a cloud architecture manner to display it to the image purchasing terminal.

It is worth noting that the foregoing three optional implementations can be combined in accordance with actual situations. For example, the transaction server simultaneously supports functions corresponding to at least two of the above three optional implementations. After S404, the transaction server may determine whether the target original image corresponding to the purchase request is locally stored. If yes, S405 is executed. For example, the target original image is fed back in response to that the target original image is locally stored. If not, S506 is executed by acquiring the target original image from the image providing device based on the authorized access path of the target original image, or S606 is executed. For example, the authorized access address of the target original image is fed back in response to that the target original image is not locally stored.

Optionally, to prevent the image from being acquired or displayed by an unauthorized device during transmission, the transaction server needs to encrypt the target original image as in the foregoing step B1.

Figure 9:
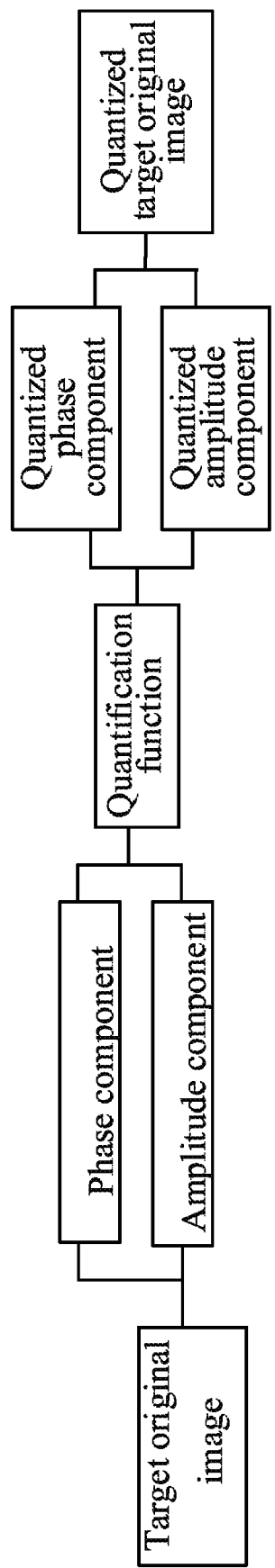
FIG. 9 is a diagram showing an example of performing an encryption process on an original image in a method for image transaction according to an embodiment of the present disclosure.

FIG. 9 is a diagram showing an example of performing an encryption process on an original image in a method for image transaction according to an embodiment of the present disclosure.

As shown in FIG. 9, the transaction server can decompose the target original image into a phase component and an amplitude component by a two-dimensional discrete Fourier transformation algorithm. Afterwards, the transaction server can quantize the decomposed phase component and the decomposed amplitude component by a phase quantification function to obtain a quantized phase component and a quantized amplitude component. Parameters of the quantification function may be obtained through a secret key. Then, the transaction server can obtain a quantized target original image in accordance with the quantized phase component and the quantized amplitude component. The quantized target original image is the target original image that is encrypted.

It should be noted that the image receiving terminal can decrypt the received target original image while the transaction server encrypts the target original image.

When the image receiving terminal and the image purchasing terminal are not the same terminal, the secret key used by the image receiving terminal for decryption can be transmitted from the image purchasing terminal to the image receiving terminal.

When the image receiving terminal and the image purchasing terminal are the same terminal, the secret key used by the image receiving terminal for decryption can be obtained in accordance with the data stored in the image receiving terminal (namely, the image purchasing terminal).

In S606, in response to that the target original image is not stored locally, the authorized access address of the target original image is fed back. The image purchasing terminal generates an access permission validation request (e.g., the purchase request) based on the authorized access address of the original image and sends it to the transaction server when receiving the authorized access address of the original image, fed hack by the transaction server, as the image receiving terminal. At this time, the transaction server needs to validate the access permission validation request (e.g., the purchase request) and then to send it to the image providing device. The image providing device feeds the target original image related to the access permission validation request (e.g., the purchase request) back to the image accessor through the transaction server in accordance with the received validated access permission validation request (e.g., the purchase request).

The validation process of the access permission validation request (e.g., the purchase request) is equivalent to that a VPN channel for accessing an original picture is provided for a terminal (realized based on SSL, IPSec, etc.). The terminal has no right to access without an authorization given by this channel. For example, when a terminal C provides a request that "I want to get a sunflower under the sun" for a picture service providing platform (belonging to the server side and being connected to the transaction server for example), if this request is directly transmitted to a server of the picture service providing platform, it will be usually directly refused by the server because it is unauthorized. The validation process of the embodiment of the present disclosure is equivalent to that a special file header is added to information of the access permission validation request (e.g., the purchase request), such that the request becomes "it is validated by the picture service providing platform that this client is a legitimate client, and the client wants to get a sunflower under the sun". Correspondingly, the image service module can transmit the original image that corresponds to "a sunflower under the sun" provided by the image provider to the image accessor.

Optionally, to prevent the original image of the image provider from being acquired or displayed by an unauthorized device during transmission, the image providing device encrypts the original image when feeding the original image back to the transaction server. The specific encryption method may refer to the foregoing process, and therefore, will not be repeated herein.

It should be noted that in the method for image transaction provided by the embodiment of the present disclosure, the transacted original image may be a high-definition digital image, namely, a high-definition version of the foregoing photo or painting. Thus, better experience of both a buyer and a seller is guaranteed, and the transaction value of the transacted digital image works is improved.

In summary, in the method for image transaction provided by the present disclosure, the transaction server can output the transaction interface information through the image purchasing terminal, and complete the transaction of the target original image after receiving the purchase request that is sent by the image purchasing terminal for requesting purchase of the target original image. In this way, the user does not need to go to museums, galleries or arts centers to buy image works. Thus, the transaction efficiency of the image works can be improved It should be noted that the step sequence of the method for image transaction provided by the embodiments of the present disclosure may be appropriately adjusted. The steps may also be correspondingly increased or decreased according to the situation. Any variation method that can be easily conceived by those skilled in the art within the technical scope of the present disclosure is intended to be included in the protection scope of the present disclosure, and therefore will not be repeated herein.

Figure 10:
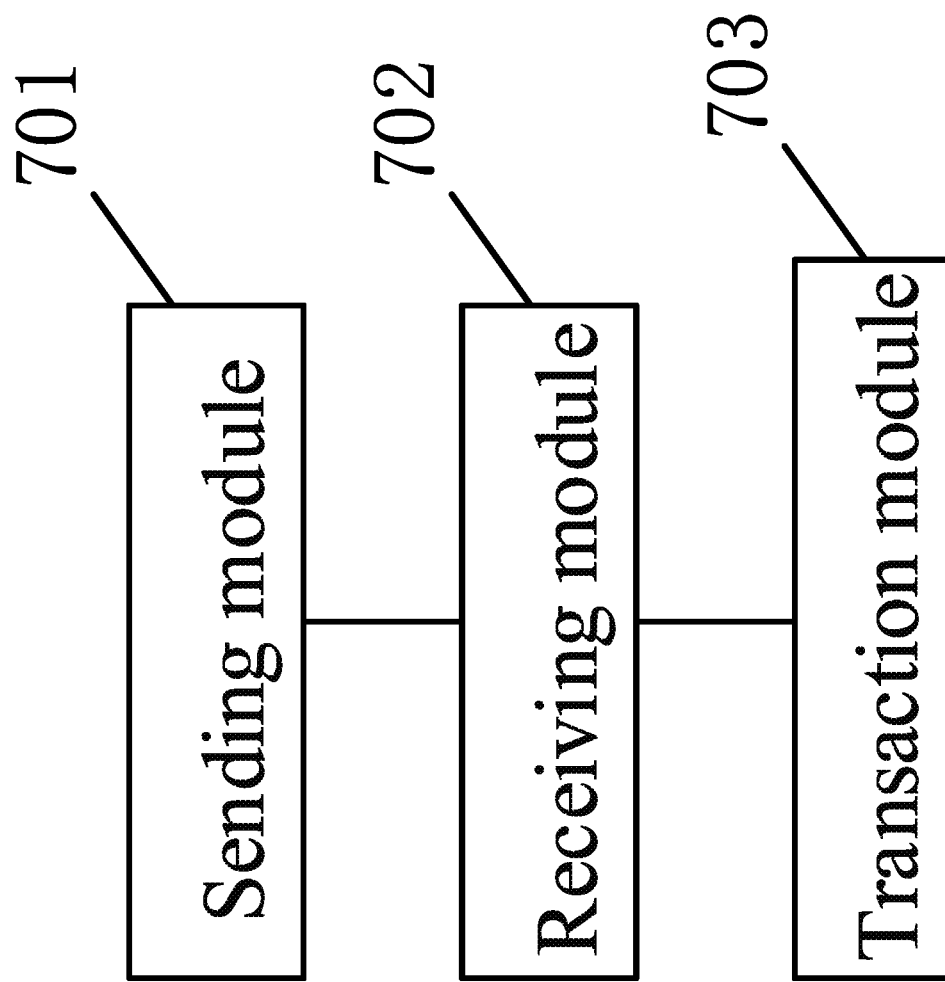
FIG. 10 is a schematic view of a modular architecture of an image transaction device according to an embodiment of the present disclosure.

Based on the same inventive concept, the present disclosure also provides an image transaction device. The image transaction device provided by the embodiment of the present disclosure will be described below with reference to FIG. 10, which is a schematic view of a modular architecture of the image transaction device according to the embodiment of the present disclosure. As shown in FIG. 10, the image transaction device includes a sending module 701, a receiving module 702 and a transaction module 703.

The sending module 701 is used to send transaction interface information to an image purchasing terminal. The transaction interface information includes data of at least one thumbnail displayed by the image purchasing terminal. Each thumbnail corresponds to one original image.

The receiving module 702 is used to receive a purchase request that is sent by the image purchasing terminal for requesting purchase of a target original image. The target original image corresponds to a target thumbnail. The target thumbnail is one of the at least one thumbnail.

The transaction module 703 is used to complete a transaction of the target original image based on the purchase request.

The image transaction device further includes other modules for executing the method for image transaction, which will not be repeated by the present disclosure.

Based on the same inventive concept, an embodiment of the present disclosure further provides a method for image transaction, which includes the following steps.

A server side outputs data of a thumbnail of an original image. The data of the thumbnail includes a thumbnail and may further includes relevant information.

A terminal receives and then displays the data of the thumbnail of the original image, and generates and sends out an access request for the target original image when receiving an acquisition instruction for the original image relevant to the thumbnail or the relevant information from a user.

The server side determines whether the corresponding target original image is stored locally when receiving the access request (e.g., a purchase request) of the target original image from the terminal, if yes, feeds the target original image back to the terminal, and if not, feeds an authorized access address of the original image back to the terminal.

Based on the same inventive concept, an embodiment of the present disclosure further provides a method for image transaction, which includes the following steps.

A transaction server sends transaction interface information to an image purchasing terminal. The transaction interface information includes data of at least one thumbnail to be displayed by the image purchasing terminal. Each thumbnail corresponds to one original image.

The image purchasing terminal receives the transaction interface information and displays at least one thumbnail based on the transaction interface information.

The image purchasing terminal sends a purchase request for requesting purchase of a target original image to a transaction server. The target original image corresponds to a target thumbnail. The target thumbnail is one of the at least one thumbnail.

The transaction server receives the purchase request and completes a transaction of the target original image based on the purchase request.

Figure 11:
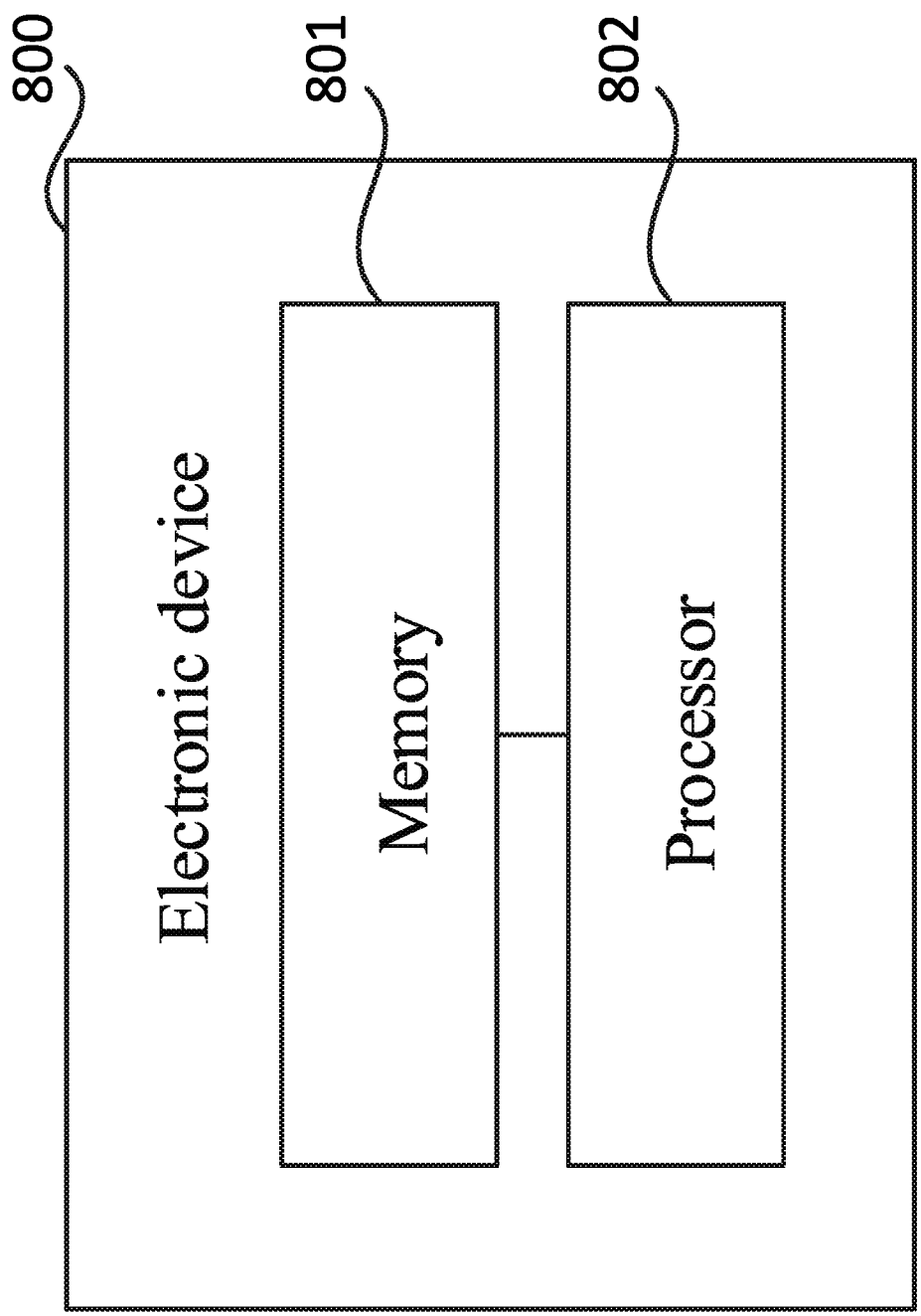
FIG. 11 is a structural schematic view of an electronic device according to an embodiment of the present disclosure.
Figure 12:
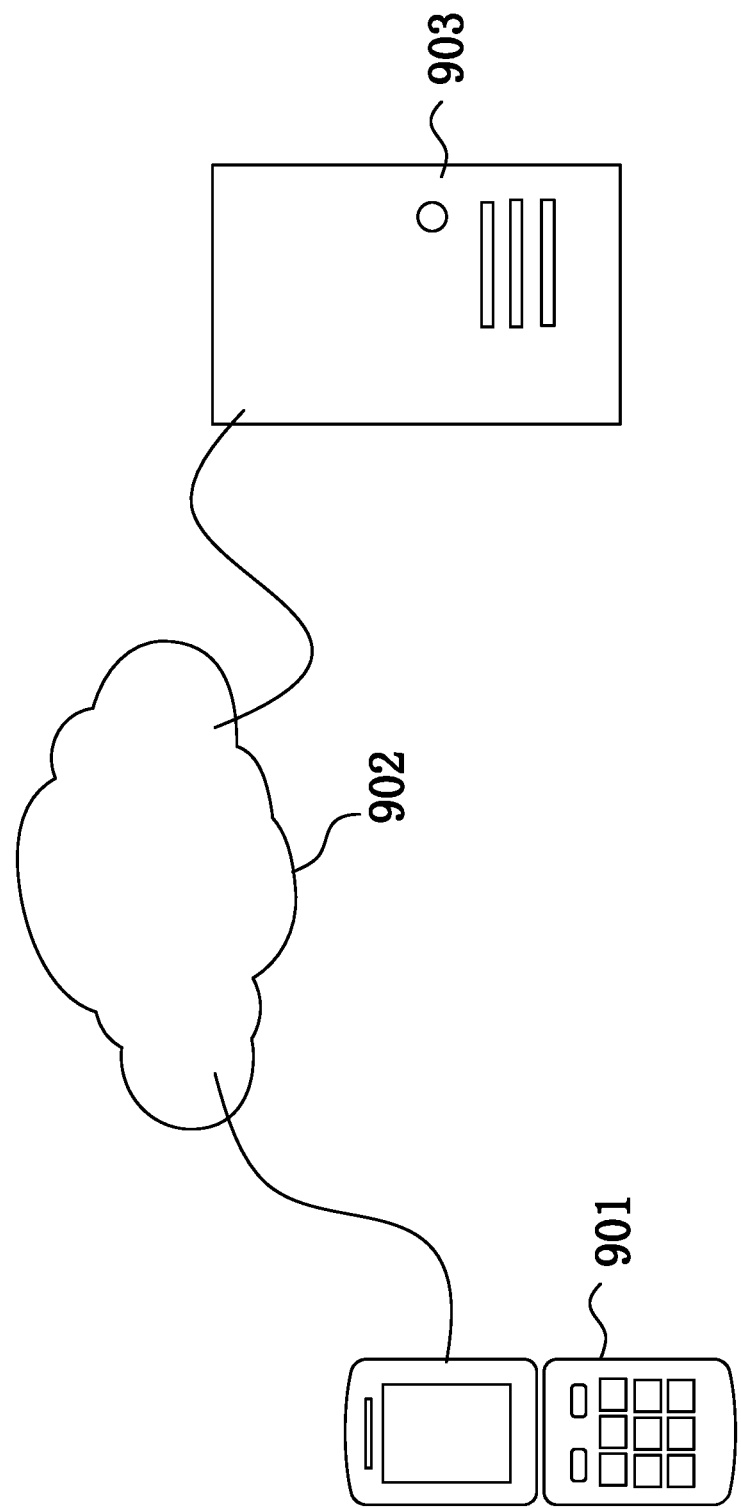
FIG. 12 is a schematic diagram showing the product structure of a system for image transaction according to an embodiment of the present disclosure.

Based on the same inventive concept, according to another aspect of the embodiment of the present disclosure, there is provided an electronic device 800 as shown in FIG. 11. The electronic device 800 includes a memory 801 and a processor 802.

At least one program is stored in the memory 801, and is used to be executed by the processor 802 and also used to implement the steps of the method for image transaction as mentioned above.

Based on the same inventive concept, an embodiment of the present disclosure further provides a system for image transaction of which the structure may refer to FIG. 1 or FIG. 2. The structure of the system for image transaction may also refer to FIG. 11. Exemplarily, the system for image transaction includes an image purchasing terminal 801 and a transaction server 802.

The transaction server 802 is used to sent transaction interface information to an image purchasing terminal. The transaction interface information includes data of at least one thumbnail to be displayed by the image purchasing terminal. Each thumbnail corresponds to one original image.

The image purchasing terminal 801 is used to receive the transaction interface information and to display the at least one thumbnail based on the transaction interface information.

The image purchasing terminal 801 is further used to send a purchase request for requesting purchase of a target original image to the transaction server. The target original image corresponds to a target thumbnail. The target thumbnail is one of the at least one thumbnail.

The transaction server 802 is further used to receive the purchase request and to complete a transaction of the target original image based on the purchase request.

Optionally, the transaction server 802 is used to:

acquire transaction data based on the purchase data, wherein the transaction data are any of an authorized access path of the target original image and data of the target original image, and the authorized access path of the target original image is a path authorized to acquire the target original image; and send the transaction data to an image receiving terminal associated with a purchase account after determining that the image purchasing terminal completes a payment operation of the target original image, wherein the image purchasing terminal is a terminal logged in with the purchase account.

Optionally, the system for image transaction further includes an image providing device 803 for providing the transaction server with data of the original image.

Optionally, the image receiving terminal is a digital picture frame.

It can be clearly known by those skilled in the art that for the convenience and brevity of the description, specific working processes of the system, the device and the unit described above may refer to the corresponding processes in the foregoing method embodiment, and therefore, will not be repeated herein.

The method for image transaction provided by the present disclosure draws both the image accessor and the provider of the original image into consideration. By displaying the thumbnail or relevant information of the original image, on one hand, the demand for quickly and conveniently reading interested images of the image accessor is met, and on the other hand, it solves the technical problem that the sale of artistic works is greatly limited because there lacks a mature communication trading method between the consumers and the holders of the works.

Based on the same inventive concept, an embodiment of the present disclosure further provides a computer storage medium on which a program corresponding to any of the above-mentioned method for image transactions is stored.

It can be understood by those skilled in the art that as used herein, the "terminal" and the "terminal device" include a device with receiving and transmitting hardware, which can perform a two-way communication on a two-way communication link. The device may include; a cellular device or other communication devices with a single-line display, and with or without a multi-line display; a PCS (Personal Communications Service) capable of combining voice, data processing, fax and/or data communication capabilities; a PDA (personal Digital Assistant) that may include a radio frequency receiver, a pager, an Internet/Intranet accessor, a web browser, a notepad, a calendar and/or a GPS ((Global Positioning System) receiver; and a conventional laptop and/or palmtop computer or other devices, which include the radio frequency receiver. As used herein, the "terminal" and the "terminal device" may be portable, transportable and mounted in vehicles (aerospace, sea and/or land), or may be suitable and/or used for local operations, and/or may run in any other locations of the earth and/or space in a distributed manner. As used herein, the "terminal" and the "terminal device" may be a communication terminal, an Internet terminal and a music/video playback terminal, e.g., a PDA, an MID (Mobile Internet Device) and/or a mobile phone with a music/video playback function, and may also be such device as a smart television or a set top box, etc.

It can be understood by those skilled in the art that devices for executing one or more of the above-mentioned operations in the present disclosure is included and involved. These devices may be specially designed and manufactured for required purposes or may include known devices in a general-purpose computer. These devices have computer programs stored therein and selectively activated or reused. The computer programs like these may be stored in a device (for example, computer) readable medium or any type of medium suitable for storing an electronic instruction and coupled to a bus. The computer readable medium includes but not limited to any type of discs (including a floppy disc, a hard disc, a compact disc, a CD-ROM and a magneto-optical disc), an ROM (Read-Only Memory), a RAM (Random Access Memory), an EPROM (Erasable Programmable Read-Only Memory), an EEPROM (Electrically Erasable Programmable Read-Only Memory), a flash memory and a magnetic card or a light card. That is, the readable medium includes any medium that can store or transmit information by a device (for example, a computer) in a readable manner.

Those skilled in the art will appreciate that the processor may be such logical operation devices with a digital processing capability and/or a program execution capability as a CPU (Central Processing Unit), an FPGA (Field Programmable Gate Array), an MCU (Microprogrammed Control Unit), a DSP (Digital Signal Processor) and an ASIC (Application-Specific Integrated Circuit).

Those skilled in the art will appreciate that a connection by communication may be a connection by networks, e.g., wireless networks, wired networks and/or any combinations of the wireless networks and the wired networks. The networks may include local area networks, Internet, the telecommunication network, Internet of Things based on the Internet and/or any combinations of the above-mentioned networks, etc. The wired networks may perform communications through a twisted pair, a coaxial cable or optical fiber transmission for instance. The wired networks may adopt such communication modes as a 3G/4G/5G mobile communication network, Bluetooth, Zigbee or Wi-Fi for instance.

It can be understood by those skilled in the art that each block of the structural views and/or block diagrams and/or flow charts and combinations of the blocks in the structural views and/or block diagrams and/or flow charts can be implemented by computer program instructions. It can also be understood by those skilled in the art that these computer program instructions may be implemented by a general-purpose computer, a special-purpose computer, or other processors of programmable data processing methods, such that the solutions specified in one or more blocks of the structural views and/or block diagrams and/or flow charts disclosed by the present disclosure are executed by the computers or other processors of programmable data processing methods.

It can be understood by those skilled in the art that steps, measures and solutions in various operations, methods and processes discussed in the present disclosure may be alternated, modified, combined or deleted. Further, other steps, measures and solutions, with the various operations, methods and processes discussed in the present disclosure, may also be alternated, modified, combined or deleted. Further, steps, measures and solutions in the prior art, with the various operations, methods and processes discussed in the present disclosure, may also be alternated, modified, combined or deleted.

The above embodiments merely represent part of embodiments of the present disclosure. It should be noted that those skilled in the art can make some improvements and modifications without departing from the principle of the present disclosure, and the improvements and modifications shall be included into the protection scope of the present disclosure.

What is claimed is:

1. A method for image transaction, applied to a transaction server in a system for image transaction, wherein the system for image transaction comprises an image purchasing terminal and the transaction server, the image purchasing terminal is a terminal logged in with a purchase account, and the method comprises:

sending transaction interface information to the image purchasing terminal, wherein the transaction interface information comprises an identifier of at least one thumbnail, and each thumbnail corresponds to one original image;

receiving a purchase request that is sent by the image purchasing terminal for requesting purchase of a target original image, wherein the target original image corresponds to a target thumbnail, the target thumbnail is one of the at least one thumbnail and the purchase request comprises an identifier of the target thumbnail;

acquiring transaction data based on the purchase request; and sending the transaction data to an image receiving terminal associated with the purchase account after determining that the image purchasing terminal completes a payment operation of the target original image, wherein the transaction data are data of the target original image, the system further comprises an image providing device, and said acquiring transaction data based on the purchase request comprises: inquiring, based on the identifier of the target thumbnail in the purchase request, a third corresponding relationship between the identifier of the thumbnail and the authorized access path, to obtain the authorized access path of the target original image, wherein the authorized access path of the target original image is a path authorized to acquire the target original image, and the authorized access path comprises an access permission and a data acquisition address; sending a data acquisition request to the image providing device indicated by the data acquisition address, wherein the data acquisition request comprises the access permission; and receiving the data of the target original image, sent b the image providing device, based on the access permission, or the transaction data are authorized access paths of the target original image, and said acquiring transaction data based on the purchase request comprises: inquiring, based on the identifier of the target thumbnail in the purchase request, a third corresponding relationship between the identifier of the thumbnail and the authorized access path, to obtain the authorized access path of the target original image.

2. The method according to claim 1, wherein the transaction data are the data of the target original image, and the method further comprises:

receiving the thumbnail of the original image sent by the image providing device, and the authorized access path of the original image; and recording the identifier of the received thumbnail and the authorized access path of the original image in the third corresponding relationship.

3. The method according to claim 1, wherein the transaction data are authorized access path of the target original image, the system further comprises an image providing device, and the method further comprises:

receiving the thumbnail of the original image sent by the image providing device, and the authorized access path of the original image; and recording the identifier of the received thumbnail and the received authorized access path of the original image in the third corresponding relationship.

4. The method according to claim 1, wherein said sending the transaction data to an image receiving terminal associated with the purchase account comprises:

encrypting the transaction data, wherein a secret key adopted for encryption is at least one of a transaction number and an identifier of the image purchasing terminal, and the transaction number is generated after the image purchasing terminal completes the payment operation of the target original image; and providing the image receiving terminal with the encrypted transaction data.

5. The method according to claim 4, wherein said encrypting the transaction data comprises:

encrypting the transaction data by the secret key in accordance with an encryption algorithm, wherein the encryption algorithm is one of a two-dimensional discrete Fourier transformation algorithm and a two-dimensional discrete cosine transform algorithm.

6. The method according to claim 1, wherein the image receiving terminal is one of the following terminals:

the terminal logged in with the purchase account;

a display terminal bound to the purchase account; and a terminal logged in with an account associated with the purchase account.

7. The method according to claim 1, further comprising:

acquiring a thumbnail that matches a resolution of a display screen of the image purchasing terminal when the image purchasing terminal accesses the transaction server; and generating the transaction interface information, wherein the transaction interface information comprises data of the thumbnail that matches the resolution of the display screen.

8. A system for image transaction, comprising: an image purchasing terminal and a transaction server; wherein the transaction server is used to send transaction interface information to the image purchasing terminal, wherein the transaction interface information comprises an identifier of at least one thumbnail, and each thumbnail corresponds to one original image;

the image purchasing terminal is used to receive the transaction interface information and to display the at least one thumbnail based on the transaction interface information;

the image purchasing terminal is further used to send a purchase request for requesting purchase of a target original image to the transaction server, wherein the target original image corresponds to a target thumbnail, and the target thumbnail is one of the at least one thumbnail, and the purchase request comprises an identifier of the target thumbnail; and the transaction server is further used to:

receive the purchase request and to acquire transaction data based on the purchase request; and send the transaction data to an image receiving terminal associated with the purchase account after determining that the image purchasing terminal completes a payment operation of the target original image, wherein the transaction data are data of the target original image, the system further comprises an image providing device, and the transaction server is further used to inquire, based on the identifier of the target thumbnail in the purchase request, a third corresponding relationship between the identifier of the thumbnail and the authorized access path, to obtain the authorized access path of the target original image, wherein the authorized access path of the target original image is a path authorized to acquire the target original image, and the authorized access path comprises an access permission and a data acquisition address; to send a data acquisition request to the image providing device indicated by the data acquisition address, wherein the data acquisition request comprises the access permission; and to receive the data of the target original image sent by the image providing device, based on the access permission, or the transaction data are authorized access paths of the target original image, and the transaction server is further used to inquire, based on the identifier of the target thumbnail in the purchase request, a third corresponding relationship between the identifier of the thumbnail and the authorized access path, to obtain the authorized access path of the target original image.

9. The system according to claim 8, wherein the image providing device is further used to provide the transaction server with data of the original image.

10. The system according to claim 8, wherein the image receiving terminal is a digital picture frame.

11. The system according to claim 8, further comprising an image providing device, wherein the transaction server is further used to:

receive the thumbnail of the original image sent by the image providing device, and the authorized access path of the original image; and record the identifier of the received thumbnail and the received authorized access path of the original image in the third corresponding relationship.

12. The system according to claim 8, wherein the transaction server is further used to:

encrypt the transaction data, wherein a secret key adopted for encryption is at least one of a transaction number and an identifier of the image purchasing terminal, and the transaction number is generated after the image purchasing terminal completes the payment operation of the target original image; and provide the image receiving terminal with the encrypted transaction data.

13. The system according to claim 12, wherein the transaction server is further used to:

encrypt the transaction data by the secret key in accordance with an encryption algorithm, wherein the encryption algorithm is one of a two-dimensional discrete Fourier transformation algorithm and a two-dimensional discrete cosine transform algorithm.

14. The system according to claim 8, wherein the transaction server is further used to:

acquire a thumbnail that matches a resolution of a display screen of the image purchasing terminal when the image purchasing terminal accesses the transaction server; and generate the transaction interface information, wherein the transaction interface information comprises data of the thumbnail that matches the resolution of the display screen.

15. An electronic device, comprising: a memory and a processor; wherein at least one program is stored in the memory and used to be executed by the processor, and the at least one program comprises instructions for performing the following operations:

sending transaction interface information to an image purchasing terminal, wherein the image purchasing terminal is a terminal logged in with a purchase account, the transaction interface information comprises an identifier of at least one thumbnail, and each thumbnail corresponds to one original image;

receiving a purchase request that is sent by the image purchasing terminal for requesting purchase of a target original image, wherein the target original image corresponds to a target thumbnail, the target thumbnail is one of the at least one thumbnail, and the purchase request comprises an identifier of the target thumbnail;

acquiring transaction data based on the purchase request; and sending the transaction data to an image receiving terminal associated with the purchase account after determining that the image purchasing terminal completes a payment operation of the target original image, wherein the transaction data are data of the target original image, the system further comprises an image providing device, and said acquiring transaction data based on the purchase request comprises: inquiring, based on the identifier of the target thumbnail in the purchase request, a third corresponding relationship between the identifier of the thumbnail and the authorized access path, to obtain the authorized access path of the target original image, wherein the authorized access path of the target original image is a path authorized to acquire the target original image, and the authorized access path comprises an access permission and a data acquisition address; sending a data acquisition request to the image providing device indicated by the data acquisition address, wherein the data acquisition request comprises the access permission; and receiving the data of the target original image, sent by the image providing device, based on the access permission, or the transaction data are authorized access paths of the target original image, and said acquiring transaction data based on the purchase request comprises: inquiring, based on the identifier of the target thumbnail in the purchase request, a third corresponding relationship between the identifier of the thumbnail and the authorized access path, to obtain the authorized access path of the target original image.

16. The electronic device according to claim 15, wherein the at least one program further comprises instructions for performing the following operations:

receiving the thumbnail of the original image sent by the image providing device, and the authorized access path of the original image; and recording the identifier of the received thumbnail and the authorized access path of the original image in the third corresponding relationship.

17. The electronic device according to claim 15, wherein said sending the transaction data to an image receiving terminal associated with the purchase account comprises:

encrypting the transaction data, wherein a secret key adopted for encryption is at least one of a transaction number and an identifier of the image purchasing terminal, and the transaction number is generated after the image purchasing terminal completes the payment operation of the target original image; and providing the image receiving terminal with the encrypted transaction data.

18. The electronic device according to claim 17, wherein said encrypting the transaction data comprises:

encrypting the transaction data by the secret key in accordance with an encryption algorithm, wherein the encryption algorithm is one of a two-dimensional discrete Fourier transformation algorithm and a two-dimensional discrete cosine transform algorithm.

19. The electronic device according to claim 15, wherein the image receiving terminal is one of the following terminals:

the terminal logged in with the purchase account;

a display terminal bound to the purchase account; and a terminal logged in with an account associated with the purchase account.

20. The electronic device according to claim 15, wherein the at least one program further comprises instructions for performing the following operations:

acquiring a thumbnail that matches a resolution of a display screen of the image purchasing terminal when the image purchasing terminal accesses the transaction server; and generating the transaction interface information, wherein the transaction interface information comprises data of the thumbnail that matches the resolution of the display screen.

* * * * *